US010181637B2

United States Patent
Tenno

(10) Patent No.: US 10,181,637 B2
(45) Date of Patent: Jan. 15, 2019

(54) ANTENNA DEVICE AND COMMUNICATION APPARATUS

(71) Applicant: Murata Manufacturing Co., Ltd., Nagaokakyo-shi, Kyoto-fu (JP)

(72) Inventor: Nobuyuki Tenno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 221 days.

(21) Appl. No.: 15/268,682

(22) Filed: Sep. 19, 2016

(65) Prior Publication Data

US 2017/0005391 A1  Jan. 5, 2017

Related U.S. Application Data

(63) Continuation of application No. PCT/JP2015/059304, filed on Mar. 26, 2015.

(30) Foreign Application Priority Data

Mar. 28, 2014  (JP) .................................. 2014-068477

(51) Int. Cl.
*H01Q 1/24* (2006.01)
*H01Q 1/22* (2006.01)
(Continued)

(52) U.S. Cl.
CPC ..... *H01Q 1/2208* (2013.01); *G06K 19/07784* (2013.01); *G06K 19/07794* (2013.01);
(Continued)

(58) Field of Classification Search
None
See application file for complete search history.

(56) References Cited

U.S. PATENT DOCUMENTS 9,727,765 B2 * 8/2017 Ikemoto ............. G06K 7/10346
9,812,764 B2 * 11/2017 Kato .................... H01Q 1/2225
(Continued)

FOREIGN PATENT DOCUMENTS

JP  2003-249813 A   9/2003
JP  2004-282403 A  10/2004
(Continued)

OTHER PUBLICATIONS

English translation of Official Communication issued in corresponding International Application PCT/JP2015/059304, dated Jun. 16, 2015.

*Primary Examiner* — Trinh Dinh
(74) *Attorney, Agent, or Firm* — Keating & Bennett, LLP

(57) ABSTRACT

An antenna device includes a power feed coil to be connected to a RFIC and a coil antenna that couples with the power feed coil. The power feed coil includes a first power feed coil and a second power feed coil connected to the first power feed coil. The second power feed coil includes a coil opening with a planar or substantially planar shape. The coil antenna includes a coil opening with a planar or substantially planar shape along a plane identical, parallel, or substantially parallel to that of the coil opening of the second power feed coil. The center of gravity of the coil antenna is located within the coil opening of the second power feed coil when viewed in plan view. A winding axis direction of the first power feed coil crosses or intersects with a winding axis direction of the coil antenna. The first power feed coil and the second power feed coil magnetically couple with the coil antenna.

18 Claims, 23 Drawing Sheets

(51) Int. Cl.
  *H01Q 7/00*  (2006.01)
  *G06K 19/077*  (2006.01)
  *H04B 5/00*  (2006.01)
  *H01Q 1/36*  (2006.01)

(52) U.S. Cl.
  CPC ............ *H01Q 1/2225* (2013.01); *H01Q 1/36* (2013.01); *H01Q 7/00* (2013.01); *H04B 5/0031* (2013.01); *H04B 5/0037* (2013.01); *H04B 5/0062* (2013.01); *H04B 5/0081* (2013.01)

(56) References Cited

U.S. PATENT DOCUMENTS

| | | |
|---|---|---|
| 2007/0051807 A1 | 3/2007 | Yamaguchi |
| 2008/0158092 A1 | 7/2008 | Yakubo et al. |
| 2009/0140053 A1* | 6/2009 | Yamazaki ........... H01L 27/1218 235/492 |
| 2009/0315680 A1 | 12/2009 | Arimura |
| 2011/0063184 A1 | 3/2011 | Furumura et al. |
| 2014/0176384 A1* | 6/2014 | Yosui ...................... H01Q 7/06 343/788 |

FOREIGN PATENT DOCUMENTS

| | | |
|---|---|---|
| JP | 2005-352858 A | 12/2005 |
| JP | 2008-067057 A | 3/2008 |
| JP | 2008-129850 A | 6/2008 |
| JP | 2008-167190 A | 7/2008 |
| JP | 2008-181492 A | 8/2008 |
| JP | 2008-197714 A | 8/2008 |
| JP | 2008-226070 A | 9/2008 |
| JP | 4325621 B2 | 9/2009 |
| JP | 2013-168756 A | 8/2013 |
| WO | 2013/183552 A1 | 12/2013 |

* cited by examiner

1B

A-A'

B-B'

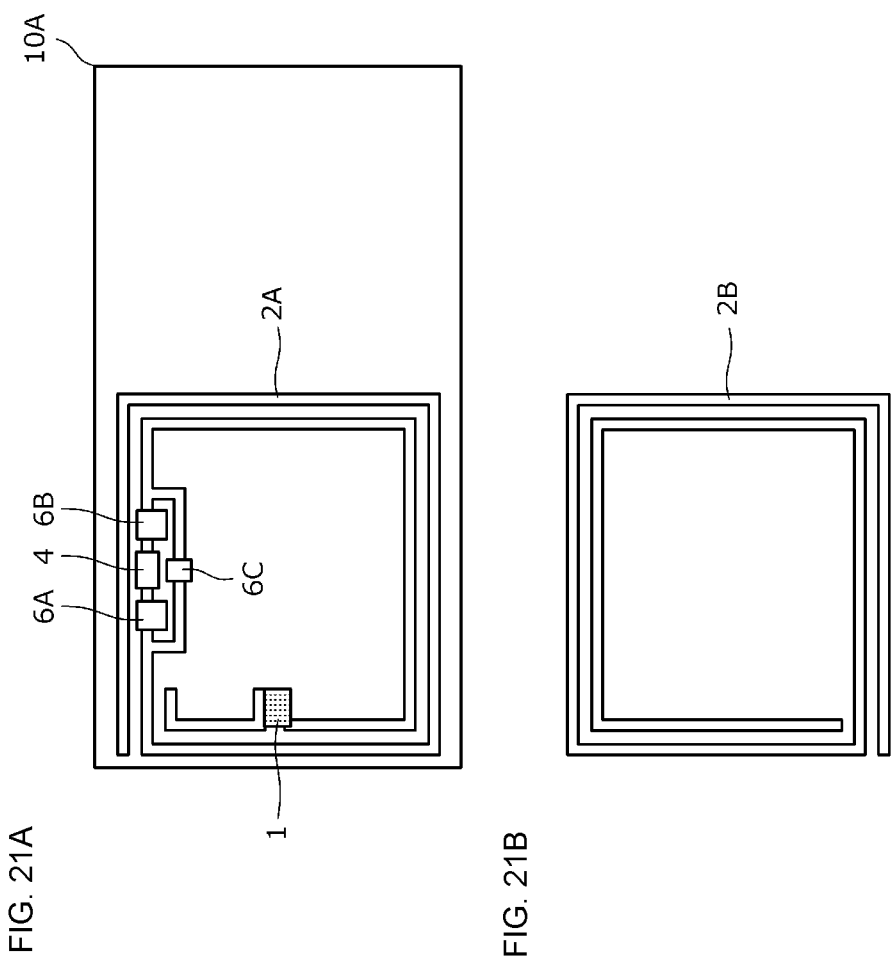

ANTENNA DEVICE AND COMMUNICATION APPARATUS

CROSS REFERENCE TO RELATED APPLICATIONS

This application claims the benefit of priority to Japanese Patent Application 2014-068477 filed Mar. 28, 2014 and is a Continuation Application of PCT/JP2015/059304 filed on Mar. 26, 2015. The entire contents of each of these applications are hereby incorporated herein by reference.

BACKGROUND OF THE INVENTION

1. Field of the Invention

The present invention relates to antenna devices preferably for use in near field communication (NFC) systems and other suitable systems, and to communication apparatuses including such antenna devices.

2. Description of the Related Art

International Publication No. 2013/183552 discloses an antenna device including a power feed coil to be connected to a power feed circuit and a booster coil antenna coupled with the power feed coil. The power feed coil described in International Publication No. 2013/183552 includes a first coil antenna and a second coil antenna. The first coil antenna and the second coil antenna are arranged in such a way that the winding axis direction of the first coil antenna is perpendicular to the winding axis direction of the booster coil antenna, whereas the winding axis of the second coil antenna is parallel to the winding axis of the booster coil antenna.

In the antenna device described in International Publication No. 2013/183552, both of the first coil antenna and the second coil antenna are coupled to the booster coil antenna only by magnetic fields around vicinities of corners of the booster coil antenna. Accordingly, the coupling strength between the power feed coil and the booster coil antenna (coil antenna) is weak.

SUMMARY OF THE INVENTION

Preferred embodiments of the present invention provide an antenna device and a communication apparatus, whose communication capabilities are improved by increasing the strength of coupling between the power feed coil and the coil antenna.

An antenna device according to a preferred embodiment of the present invention includes a power feed coil to be connected to a power feed circuit and a coil antenna that electro-magnetically couples with the power feed coil, wherein the power feed coil includes a first power feed coil and a second power feed coil connected to the first power feed coil, the second power feed coil includes a coil opening that has a planar or substantially planar configuration, the coil antenna includes a coil opening that has a planar or substantially planar configuration along a plane identical, parallel, or substantially parallel to that of the coil opening of the second power feed coil, a center of gravity of the coil antenna is located within the coil opening of the second power feed coil when viewed in plan view, and a winding axis direction of the first power feed coil crosses or intersects a winding axis direction of the coil antenna.

With the above-described structure, the first power feed coil picks up magnetic flux in a surface direction (lateral direction) of the coil antenna, and the second power feed coil picks up magnetic flux in a direction vertical to that surface (longitudinal direction). Furthermore, the strength of coupling between the second power feed coil and the coil antenna is high. Therefore, the strength of coupling between the power feed coil (first power feed coil and second power feed coil) and the coil antenna is high, thus making it possible to obtain high communication capabilities.

In an antenna device according to a preferred embodiment of the present invention, preferably, the first power feed coil includes a plurality of first power feed coils. This increases the number of locations at which an antenna of a communication counterpart is able to be coupled, and widens a communicable range.

In an antenna device according to a preferred embodiment of the present invention, preferably, the plurality of first power feed coils includes two first power feed coils that face each other over the coil opening of the coil antenna. This structure increases the distance between the first power feed coils facing each other, thus widening the communicable range.

In an antenna device according to a preferred embodiment of the present invention, preferably, the plurality of first power feed coils includes two first power feed coils whose winding axis directions cross or intersect with each other. This structure widens a communicable angular range.

In an antenna device according to a preferred embodiment of the present invention, preferably, a winding axis of the second power feed coil and a winding axis of the coil antenna are arranged coaxially with one another. This allows the second power feed coil and the coil antenna to wind around side by side, thus making it possible to increase the strength of coupling between the second power feed coil and the coil antenna.

In an antenna device according to a preferred embodiment of the present invention, preferably, the power feed coil and the coil antenna are provided on a substrate. This facilitates the formation of the power feed coil and the coil antenna and enables the thickness of the antenna device to be reduced.

In an antenna device according to a preferred embodiment of the present invention, preferably, a touch operation detection electrode (touch pad electrode) is provided on the substrate. This eliminates the need for dedicated space to locate an antenna for near field communication.

In an antenna device according to a preferred embodiment of the present invention, preferably, two connection locations, to be connected to the second power feed coil, at both end portions of the first power feed coil are arranged at locations that cross over the coil antenna. According to this structure, the coil antenna as well as the first power feed coil are arranged on the same substrate. This enables downsizing of the antenna device. Furthermore, when viewed in a plan view, the first power feed coil and the coil antenna partially overlap one another. This increases the strength of coupling between the first power feed coil and the coil antenna.

In an antenna device according to a preferred embodiment of the present invention, preferably, a first substrate and a second substrate are further included, wherein the power feed coil is provided on the first substrate, and the coil antenna is provided on the second substrate. This structure enables the power feed coil and the coil antenna to be arranged close to each other in a stacking direction. This enables not only magnetic coupling (induction coupling) but also electrical coupling (capacitive coupling), thus making it possible to further increase the strength of coupling between the power feed coil and the coil antenna.

A communication apparatus according to a preferred embodiment of the present invention includes an antenna device and a power feed circuit connected to the antenna device, wherein the antenna device includes a power feed coil to be connected to the power feed circuit and a coil antenna coupled with the power feed coil, the power feed coil includes a first power feed coil and a second power feed coil connected in series to the first power feed coil, the second power feed coil includes a coil opening that has a planar or substantially planar configuration, the coil antenna includes a coil opening that has a planar or substantially planar configuration along a plane identical, parallel, or substantially parallel to that of the coil opening of the second power feed coil, a center of gravity of the coil antenna is located within the coil opening of the second power feed coil when viewed in a plan view, and a winding axis direction of the first power feed coil crosses or intersects with a winding axis direction of the coil antenna.

The above-described structure enables near field communication with high communication capability.

According to preferred embodiments of the present invention, the first power feed coil picks up magnetic flux in a surface direction (lateral direction) of the coil antenna, and the second power feed coil picks up magnetic flux in a direction vertical to that surface (longitudinal direction). Furthermore, the strength of coupling between the second power feed coil and the coil antenna is high. Therefore, the strength of coupling between the power feed coil (first power feed coil and second power feed coil) and the coil antenna is high, thus making it possible to obtain high communication capability.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 21A is a plan view of a first substrate 10A embedded in a chassis of a communication apparatus, and FIG. 21B is a transparent view illustrating conductor patterns disposed on a lower surface of the first substrate 10A.

DETAILED DESCRIPTION OF THE PREFERRED EMBODIMENTS

Figure 1A:
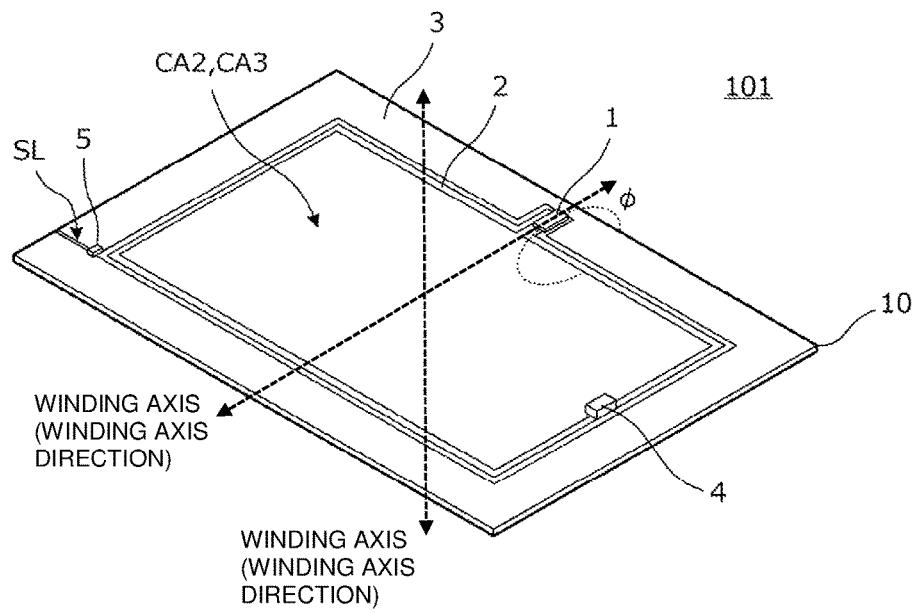
FIG. 1A is a perspective view of an antenna device 101 according to a first preferred embodiment of the present invention.

Preferred embodiments of the present invention will be described below with reference to the drawings. The same reference characters designate same or similar elements throughout the drawings. Each preferred embodiment is for illustrative purposes only, and the elements of different preferred embodiments may be partially exchanged and/or combined. In descriptions of the second preferred embodiment and subsequent preferred embodiments, descriptions regarding matters and elements common to the first preferred embodiment will not be repeated, and only differences from the first preferred embodiment will be described. Particularly, redundant descriptions regarding the same of similar functions and effects produced by common elements will not be provided in each preferred embodiment.

First Preferred Embodiment

Figure 1B:
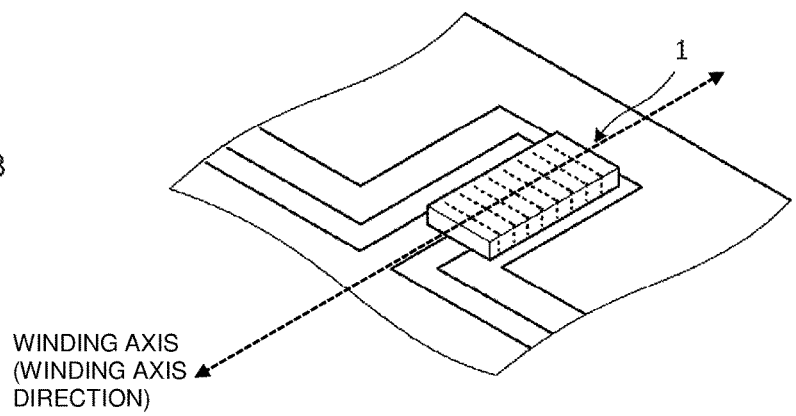
FIG. 1B is an enlarged perspective view of a mounting location of a first power feed coil 1.
Figure 1C:
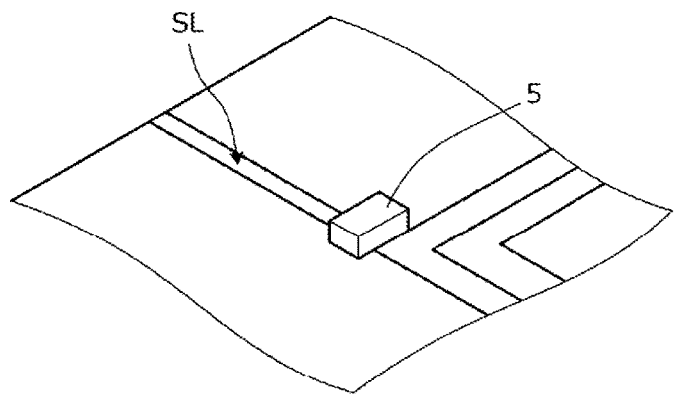
FIG. 1C is an enlarged perspective view of a mounting location of a chip capacitor.
Figure 2:
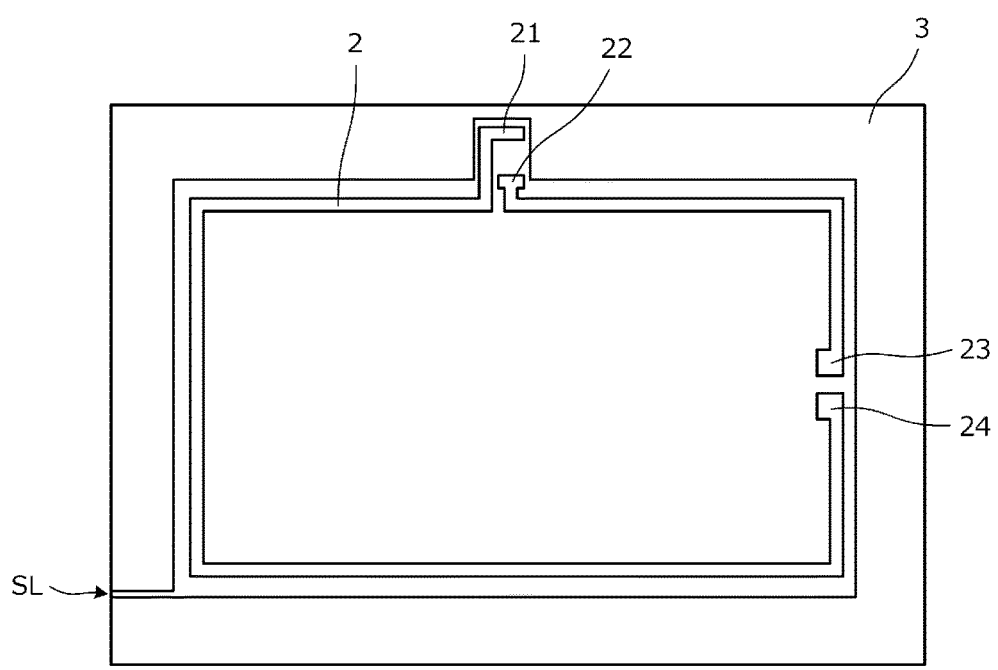
FIG. 2 is a plan view depicting conductor patterns disposed on a substrate included in the antenna device 101.

FIG. 1A is a perspective view of an antenna device 101 according to a first preferred embodiment of the present invention, FIG. 1B is an enlarged perspective view of a mounting location of a first power feed coil 1, and FIG. 1C is an enlarged perspective view of a mounting location of a chip capacitor 5. FIG. 2 is a plan view illustrating conductor patterns disposed on a substrate included in the antenna device 101.

As shown in FIG. 1A and FIG. 2, a second power feed coil and a coil antenna 3 are disposed on an upper surface of a substrate 10. The second power feed coil 2 and the coil antenna 3 are each preferably made of, for example, a copper foil pattern. The coil antenna 3 is disposed along the outer edge of the substrate 10. The second power feed coil 2 is disposed along the inner perimeter of the coil antenna 3. In the second power feed coil 2, a first power feed coil connection electrodes 21 and 22 and RFIC connection electrodes 23 and 24 are provided. In the coil antenna 3, a slit SL is provided.

The first power feed coil 1 is mounted on the first power feed coil connection electrodes 21 and 22, and a RFIC 4 is mounted on the RFIC connection electrodes 23 and 24. Furthermore, a chip capacitor 5 is mounted on the slit SL of the coil antenna 3.

As described above, the antenna device 101 preferably includes the first power feed coil 1, the second power feed coil 2, and the coil antenna 3. The second power feed coil 2 includes a coil opening CA2 that has a planar or substantially planar configuration, and the coil antenna 3 includes a coil opening CA3 that has a planar or substantially planar configuration along the identical or substantially identical plane to that of the coil opening CA2 of the second power feed coil 2.

Figure 3:
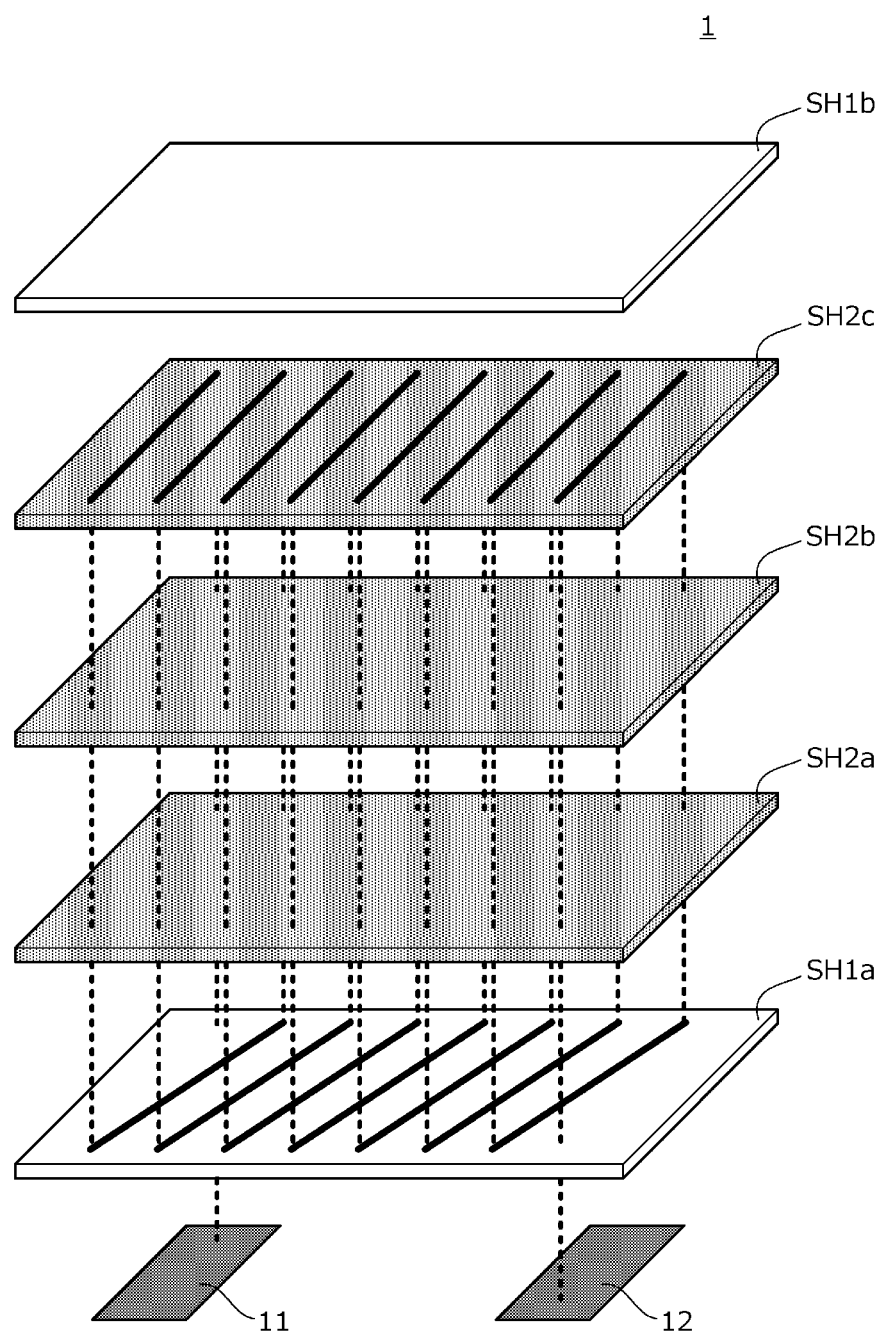
FIG. 3 is an exploded perspective view illustrating a configuration of the first power feed coil 1.

FIG. 3 is an exploded perspective view showing a configuration of the first power feed coil 1. The first power feed coil 1 preferably includes a multilayer body including magnetic layers SH2a, SH2b, and SH2c and non-magnetic layers SH1a and SH1b. A plurality of linear conductors is each provided on the magnetic layer SH2c and the non-magnetic layer SH1a. Via conductors connecting the linear conductors are provided in the magnetic layers SH2a, SH2b, and SH2c. Terminals 11 and 12 are disposed on a lower surface of the non-magnetic layer SH1a. Via conductors are provided on the magnetic layers SH2a, SH2b, and SH2c and the non-magnetic layer SH1a to connect end portions of the linear conductors located at both outer sides of the plurality of linear conductors provided on the magnetic layer SH2c to the terminals 11 and 12. As described above, the first power feed coil 1 preferably is a chip component, for example.

The winding axis of the first power feed coil 1 extends in a surface direction of the substrate 10, and the winding axis of the coil antenna 3 is in a direction perpendicular or substantially perpendicular to the surface of the substrate 10. In other words, the winding axis direction of the first power feed coil 1 crosses or intersects with the winding axis direction of the coil antenna 3, and the winding axis direction of the power feed coil 1 cuts across the opening of the first coil antenna 3 in plan view of the substrate 10 along the winding axis direction of the coil antenna 3.

The second power feed coil 2 is disposed along the coil antenna 3. Thus, the second power feed coil 2 is electrically coupled with the coil antenna 3. Furthermore, the winding axis of the second power feed coil 2 and the winding axis of the coil antenna 3 are coaxial or substantially coaxial with one another. Thus, the second power feed coil 2 magnetically couples with the coil antenna 3. Furthermore, as depicted in FIG. 1B, the winding axis direction of the first power feed coil 1 is a direction that enables interlinking with the coil antenna 3. Thus, as denoted by magnetic flux φ in FIG. 1A, the first power feed coil 1 magnetically couples with the coil antenna 3.

Figure 4:
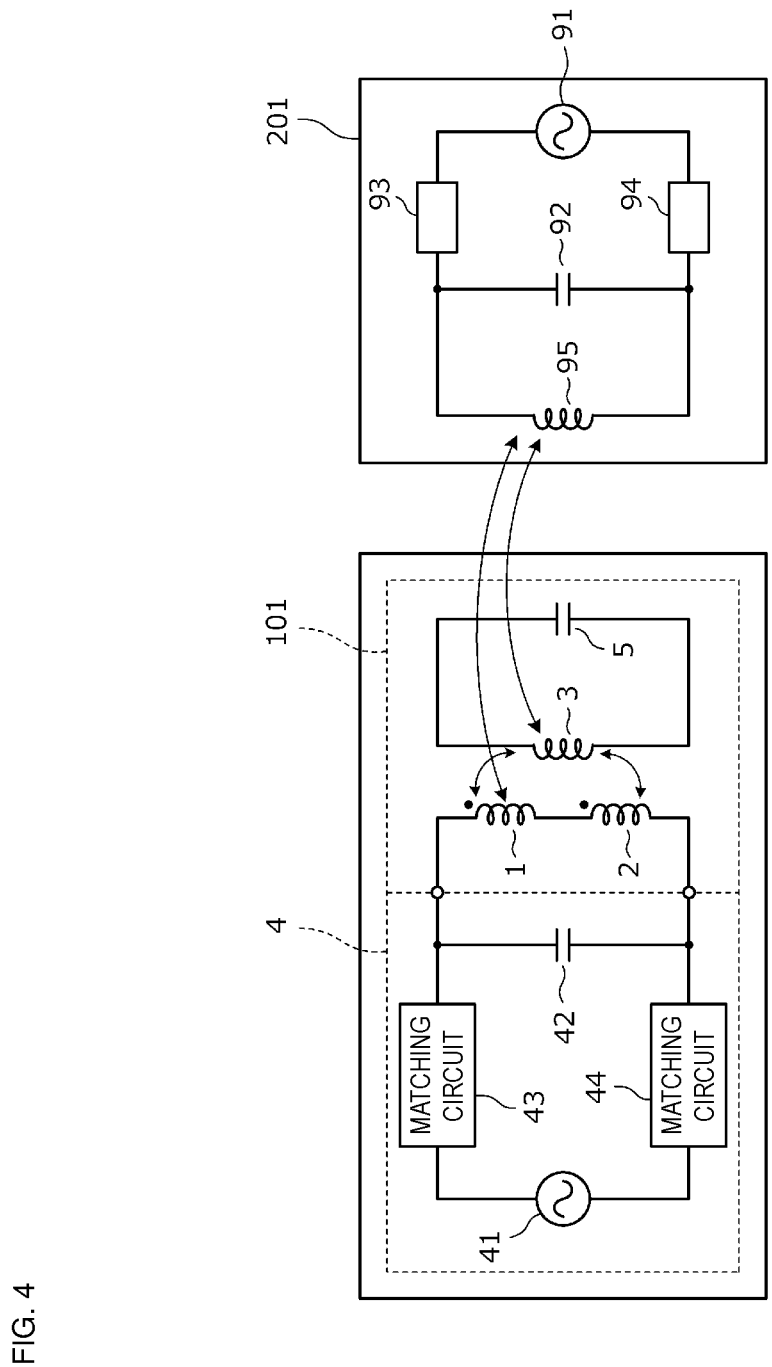
FIG. 4 is a circuit diagram of a communication circuit including the antenna device 101 according to the first preferred embodiment of the present invention.

FIG. 4 is a circuit diagram of a communication circuit including the antenna device 101 according to the present preferred embodiment. The first power feed coil 1 of the antenna device 101 is connected in series to the second power feed coil 2, and the coil antenna 3 electrically or magnetically couples with the first power feed coil 1 and the second power feed coil 2. The coil antenna 3 defines a LC resonance circuit with the capacitor 5, and this LC resonance circuit resonates in a frequency band of near field communication.

The RFIC 4 is connected to a series circuit of the first power feed coil 1 and the second power feed coil 2. The RFIC 4 includes the power feed circuit 41, matching circuits 43 and 44, and a capacitor 42. The matching circuits 43 and 44 and the capacitor 42 match the antenna device 101 and the power feed circuit 41. The capacitor 42 defines a resonance circuit with the first power feed coil 1 and the second power feed coil 2, and this resonance circuit resonates in a frequency band of near field communication.

As will be described below, the resonance circuit including the coil antenna 3 and the capacitor 5 and the resonance circuit including the first power feed coil 1, the second power feed coil 2, and the capacitor 42 are coupled together and resonate at a plurality of frequencies.

As shown in FIG. 4, a communication counterpart preferably is an RFID card 201, for example. The RFID card 201 includes a power feed circuit 91, a coil antenna 95, matching circuits 93 and 94, and a capacitor 92. The coil antenna 3 or the first power feed coil 1 of the antenna device 101 magnetically couples with the coil antenna 95 of the RFID card 201. Alternatively, both of the coil antenna 3 and the first power feed coil 1 magnetically couple with the coil antenna 95 of the RFID card 201.

Figure 5:
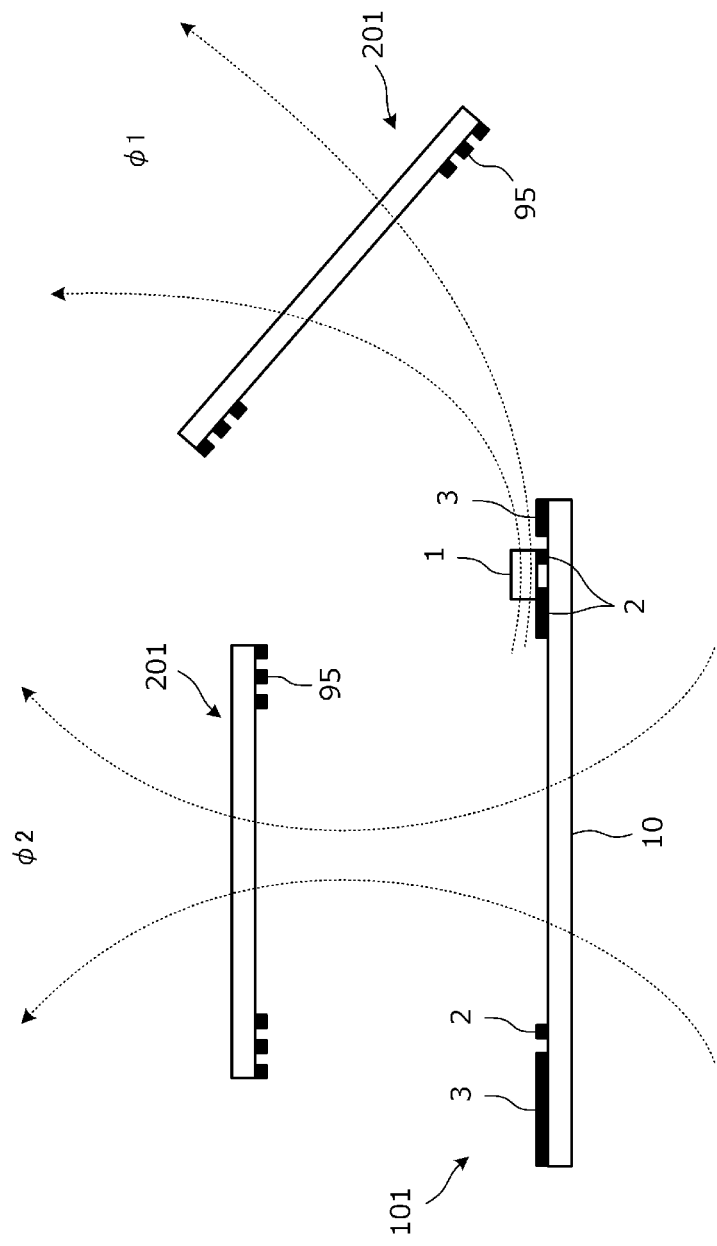
FIG. 5 is a view illustrating the spatial relationship and coupling between the antenna device 101 and a RFID card 201.

FIG. 5 is a view showing the spatial relationship and coupling between the antenna device 101 and the RFID card 201. When the RFID card 201 is held over the substrate 10 of the antenna device 101 so as to be parallel or substantially parallel thereto, the coil antenna 95 of the RFID card 201 couples primarily with the coil antenna 3 of the antenna device 101 via magnetic flux φ2. When the RFID card 201 is held over the substrate 10 of the antenna device 101 so as to be perpendicular, substantially perpendicular, or inclined thereto, the coil antenna 95 of the RFID card 201 couples primarily with the first power feed coil 1 of the antenna device 101 via magnetic flux φ1.

As described above, the coil antenna 95 of the RFID card 201 couples not only with the coil antenna 3, but also with the first power feed coil 1. Since the first power feed coil 1 and the coil antenna 3 are different from each other in location and direction of magnetic flux to pick up, the communication is possible even when the RFID card 201 is carelessly passed over or placed thereon.

Figure 6:
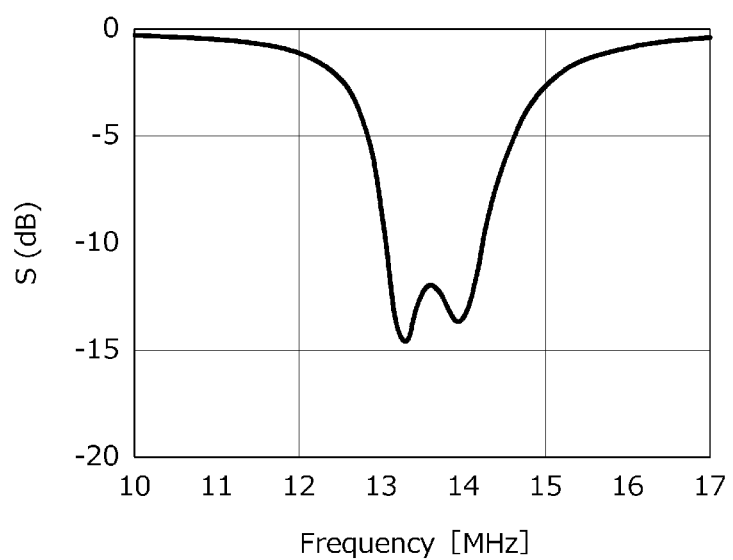
FIG. 6 is a diagram illustrating a frequency characteristic of return loss when an antenna device 101 side is seen from a power feed circuit 41 of FIG. 4.

FIG. 6 is a diagram showing a frequency characteristic of return loss when the antenna device 101 side is seen from the power feed circuit 41 of FIG. 4. As described above, the resonance circuit including the coil antenna 3 and the capacitor 5 couples with the resonance circuit including the first power feed coil 1, the second power feed coil 2, and the capacitor 42. As a result of the achievement of multiple resonances by this coupling, the return loss is reduced over a wider band range. Accordingly, communication is possible even when the resonant frequency of a coil antenna of a communication counterpart, such as a RFID card, for example, is somewhat deviated.

According to the present preferred embodiment, the first power feed coil 1 is connected in series to the second power feed coil 2. This enables an increase in the composite inductance and facilitates the setting of a predetermined resonant frequency. Furthermore, in spite of its small size, the inductance of the first power feed coil 1 is higher than the inductance of the second power feed coil 2. Thus, the inductance value is able to be increased by the first power feed coil 1.

Figure 7A:
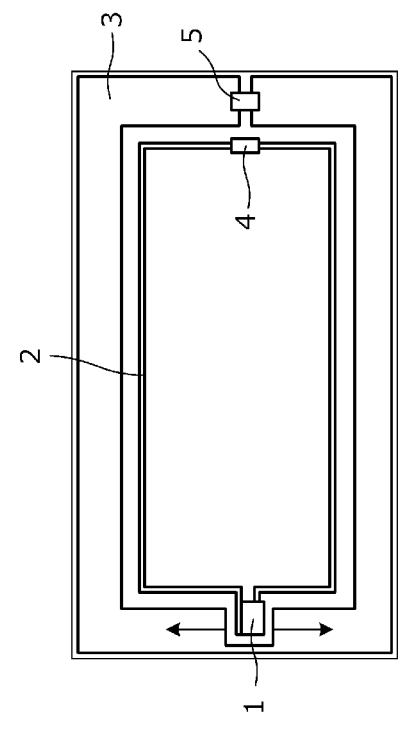
FIGS. 7A to 7D are views illustrating some examples of arrangement locations of the first power feed coil 1 and a chip capacitor 5.
Figure 7C:
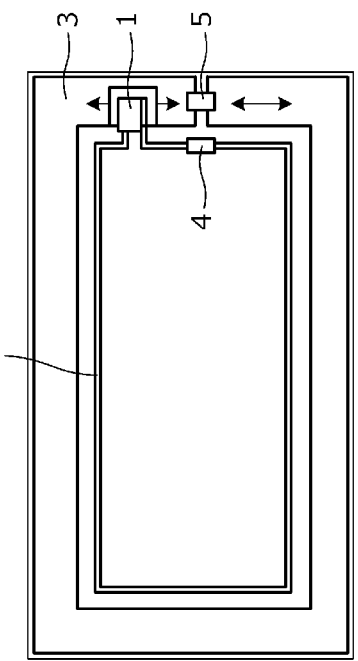
Figure 7B:
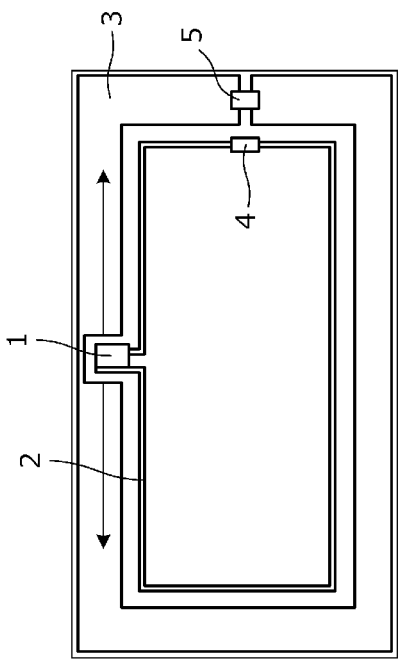
Figure 7D:
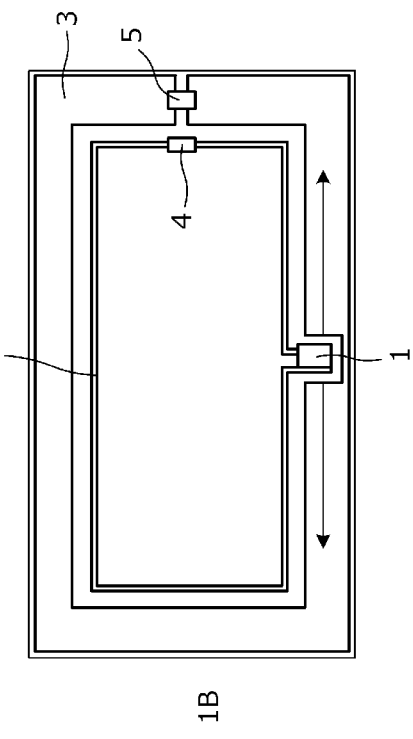

As shown in FIGS. 1A to 2, the first power feed coil 1 is connected to the rectangular or substantially rectangular second power feed coil 2 at the center or approximate center of one longer side thereof. However, the location of the first power feed coil 1 is not limited thereto. Furthermore, the location of the slit SL provided in the coil antenna 3 (mounting location of the chip capacitor 5) is not limited to the location shown in FIGS. 1A to 2. FIGS. 7A to 7D are views showing other examples of suitable locations. As shown in FIG. 7A, the chip capacitor 5 may alternatively be located at the center or approximate center of one shorter side of the rectangular or substantially rectangular coil antenna 3. Alternatively, as shown in FIG. 7A and FIG. 7B, the first power feed coil 1 may be located at either one of the longer sides of the coil antenna 3. Alternatively, as shown in FIG. 7C, the first power feed coil 1 and the chip capacitor 5 may be located at opposing sides. Still alternatively, as shown in FIG. 7D, the first power feed coil 1 and the chip capacitor 5 may be located at the same side.

Second Preferred Embodiment

Figure 8:
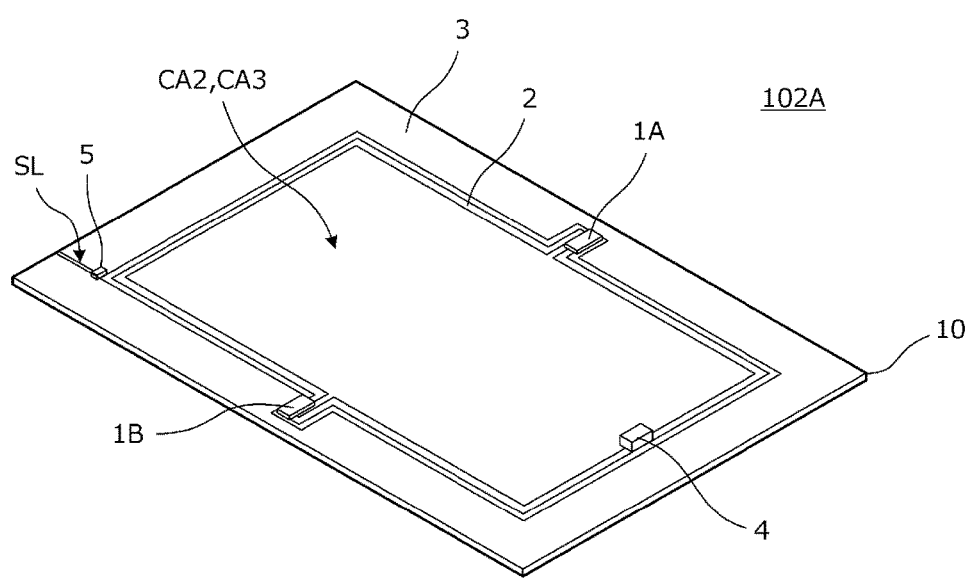
FIG. 8 is a perspective view of an antenna device 102A according to a second preferred embodiment of the present invention.

FIG. 8 is a perspective view of an antenna device 102A according to the second preferred embodiment of the present invention. The second power feed coil 2 and the coil antenna 3 are disposed on the upper surface of the substrate 10. The second power feed coil 2 and the coil antenna 3 each preferably include, for example, a copper foil pattern. The coil antenna 3 is disposed along the outer edge of the substrate 10. The second power feed coil 2 is disposed along the inner perimeter of the coil antenna 3. In this example, the first power feed coil preferably includes two first power feed coils 1A and 1B. These two first power feed coils 1A and 1B are arranged at centers or approximate centers of two longer sides of the coil antenna 3, respectively.

Figure 9:
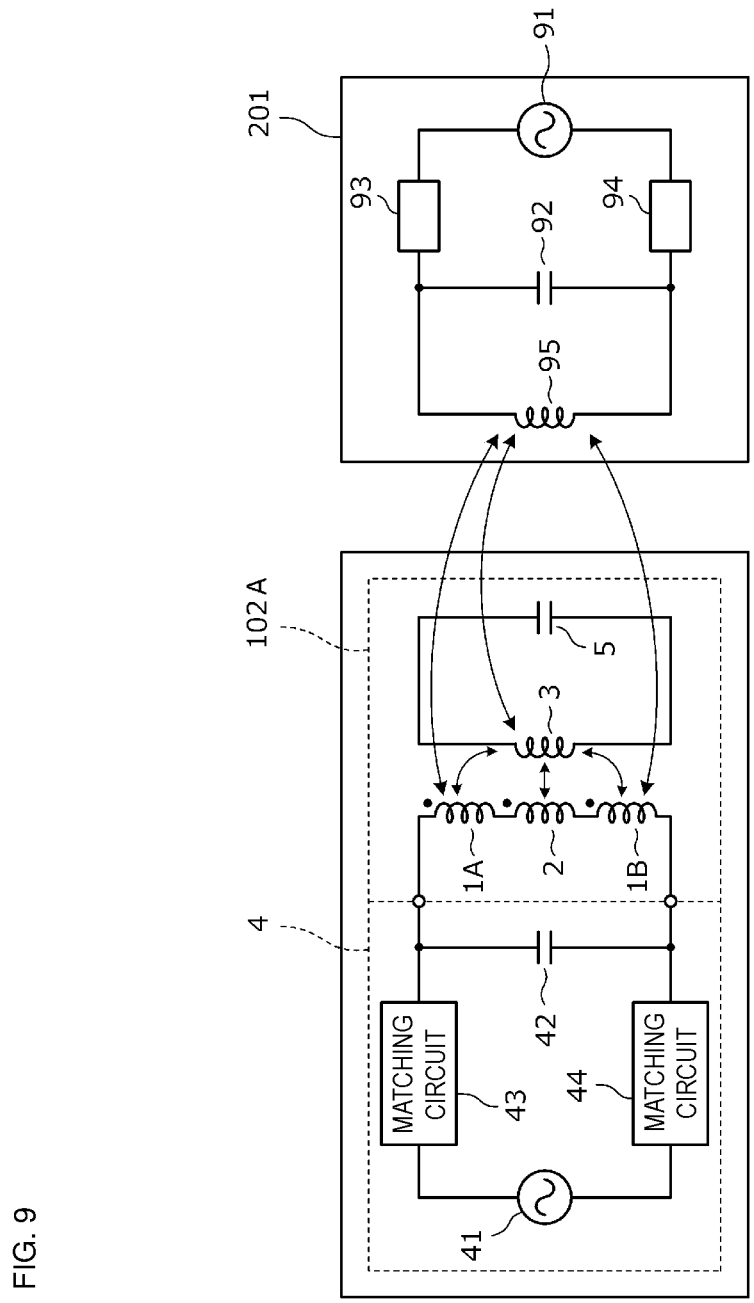
FIG. 9 is a circuit diagram of a communication circuit including the antenna device 102A according to the second preferred embodiment of the present invention.

FIG. 9 is a circuit diagram of a communication circuit including the antenna device 102A according to the present preferred embodiment. The first power feed coils 1A and 1B of the antenna device 102A are connected in series to the second power feed coil 2, and the coil antenna 3 is electrically or magnetically coupled with the first power feed coils 1A and 1B and the second power feed coil 2. The coil antenna 3 defines a LC resonance circuit with the capacitor 5, and this LC resonance circuit resonates in a frequency band of near field communication.

The RFIC 4 is connected to a series circuit of the first power feed coils 1A and 1B and the second power feed coil 2. The RFIC 4 includes the power feed circuit 41, the matching circuits 43 and 44, and the capacitor 42. The matching circuits 43 and 44 and the capacitor 42 match the antenna device 102A and the power feed circuit 41. Furthermore, the capacitor 42 defines a resonance circuit with the first power feed coils 1A and 1B and the second power feed coil 2, and this resonance circuit resonates in a frequency band of near field communication.

As shown in FIG. 9, the RFID card 201 that defines and functions as a communication counterpart includes the power feed circuit 91, the coil antenna 95, the matching circuits 93 and 94, and the capacitor 92. The coil antenna 95 of the RFID card 201 magnetically couples with one or a combination of some or all of the coil antenna 3, the first power feed coil 1A, and the first power feed coil 1B of the antenna device 102A.

Figure 10:
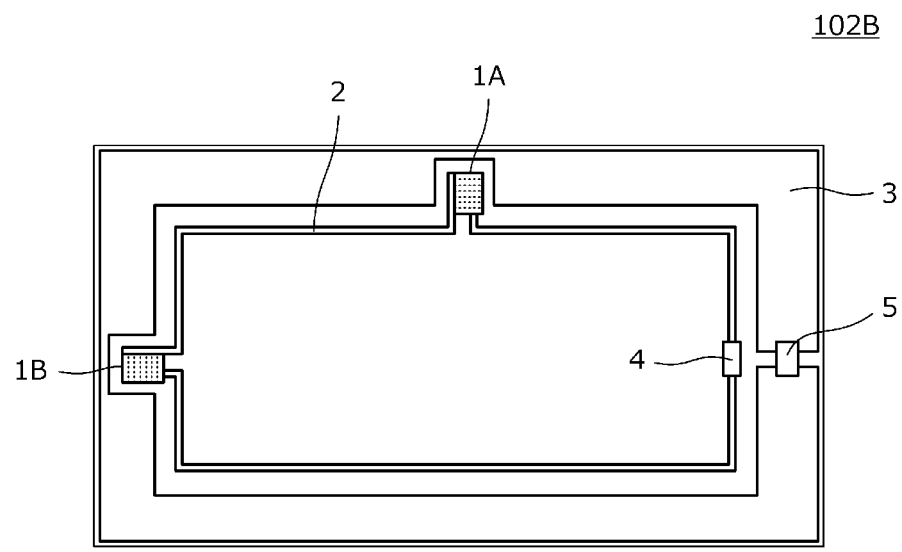
FIG. 10 is a view illustrating an arrangement example of two first power feed coils 1A and 1B.

As shown in FIG. 8, the two first power feed coils 1A and 1B are preferably arranged such that their winding axis directions are aligned or substantially aligned with each other. Alternatively, for example, as in an antenna device 102B depicted in FIG. 10, the two first power feed coils 1A and 1B may be arranged such that their winding axis directions cross or intersect each other, i.e. are perpendicular or substantially perpendicular to each other as shown in FIG. 10.

According to the present preferred embodiment, defining the first power feed coil so as to include a plurality of first power feed coils, the number of locations at which an antenna of the communication counterpart is coupled increases, and a communicable range is widened. Furthermore, by providing a configuration in which a plurality of first power feed coils is arranged across the coil opening CA3 of the coil antenna 3 so as to face each other, the distance between the first power feed coils facing each other increases, thus widening the communicable range. Furthermore, by providing a configuration in which the winding axis directions of a plurality of first power feed coils cross or intersect each other, a communicable angular range is widened.

Third Preferred Embodiment

Figure 11:
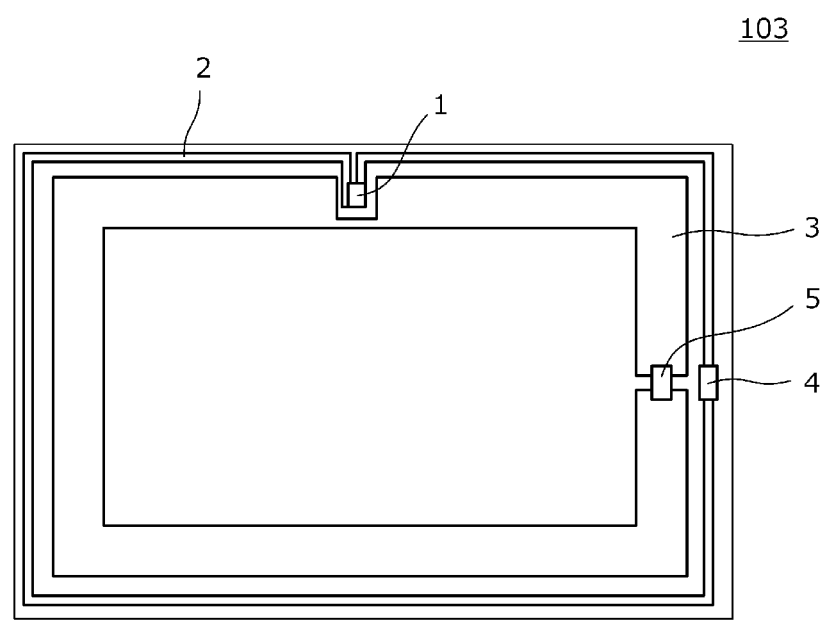
FIG. 11 is a plan view of an antenna device 103 according to a third preferred embodiment of the present invention.

FIG. 11 is a plan view of an antenna device 103 according to the third preferred embodiment of the present invention. In the first and second preferred embodiments, the second power feed coil 2 is disposed along the inner perimeter of the coil antenna 3. However, in the present preferred embodiment, the second power feed coil 2 is disposed along the outer perimeter of the coil antenna 3.

As described above, the second power feed coil 2 may be disposed at the outer side of the coil antenna 3.

Fourth Preferred Embodiment

Figure 12:
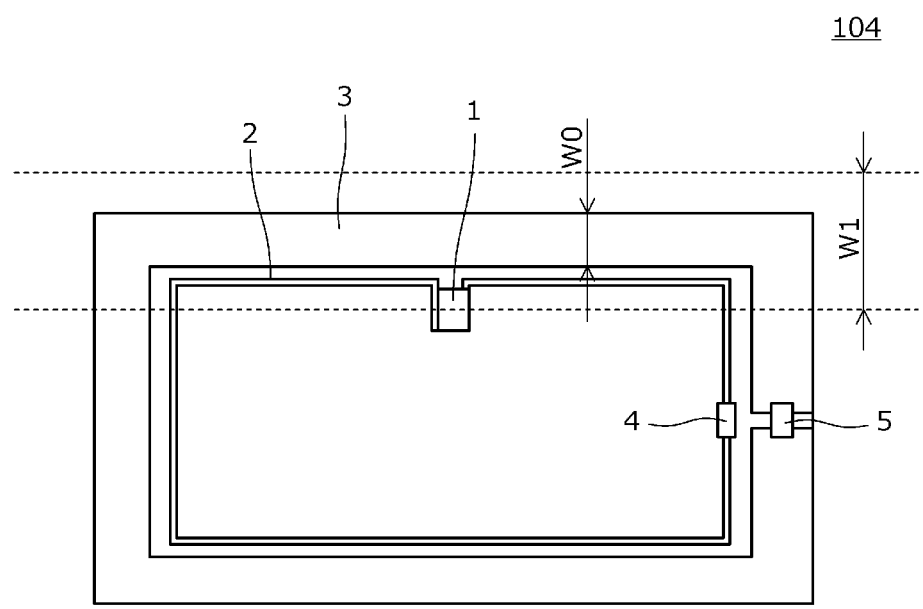
FIG. 12 is a plan view of an antenna device 104 according to a fourth preferred embodiment of the present invention.

FIG. 12 is a plan view of an antenna device 104 according to the fourth preferred embodiment of the present invention. In the first to third preferred embodiments, the first power feed coil 1 is arranged within the line width W0 of the coil antenna 3. However, in the present preferred embodiment, the arrangement of the first power feed coil 1 is not limited thereto. It is expected that sufficient coupling will be provided between the first power feed coil and the coil antenna 3 as long as at least a portion of the first power feed coil 1 is within the width W1 that is thicker than the line width of the coil antenna 3 by about the size of single unit of the first power feed coil 1 as depicted in FIG. 12.

Fifth Preferred Embodiment

Figure 13A:
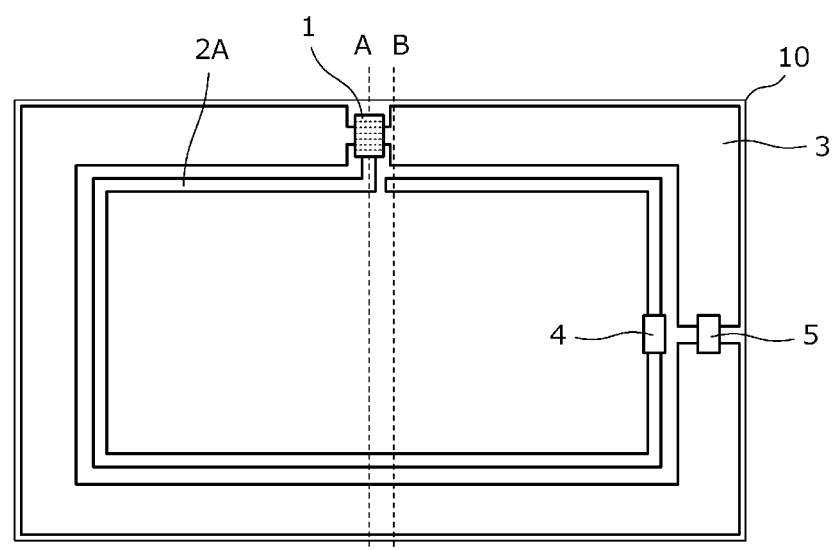
FIG. 13A is a plan view of an antenna device 105 according to a fifth preferred embodiment of the present invention.
Figure 13B:
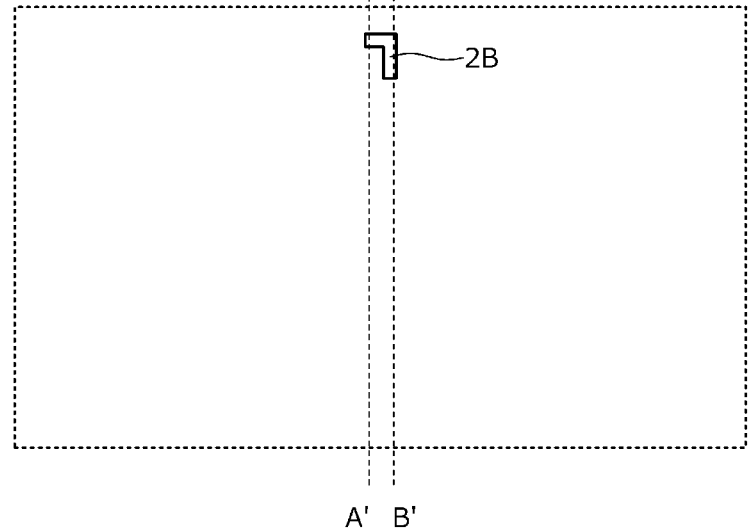
FIG. 13B is a view illustrating conductor patterns disposed on a lower surface of a substrate 10.
Figure 14A:
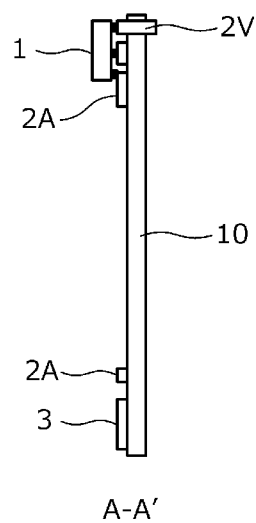
FIG. 14A is a cross-sectional view at A-A' in FIGS. 13A and 13B.
Figure 14B:
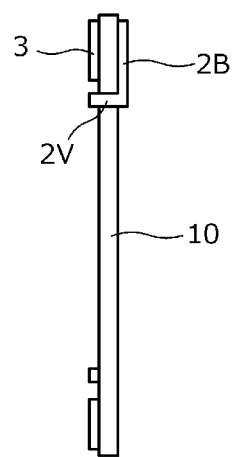
FIG. 14B is a cross-sectional view at B-B' in FIGS. 13A and 13B.
Figure 15:
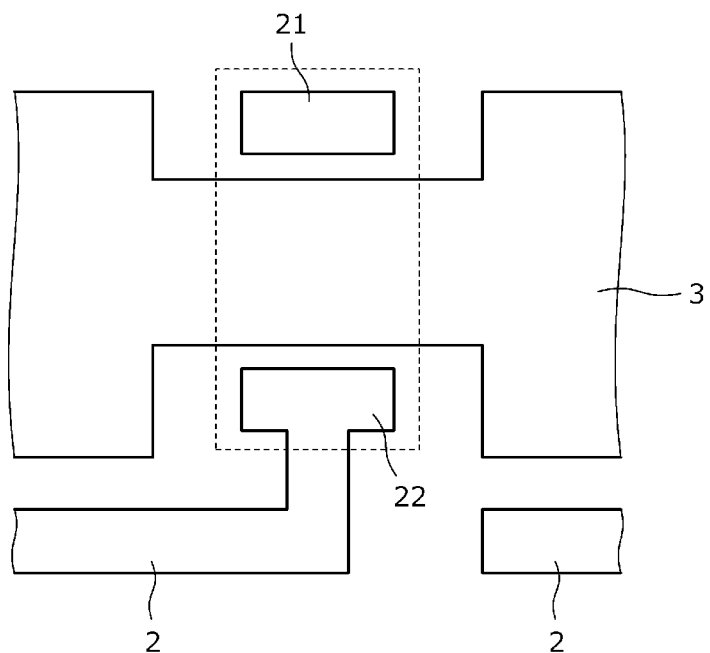
FIG. 15 is an enlarged plan view illustrating a mounting location of the first power feed coil 1.
Figure 16:
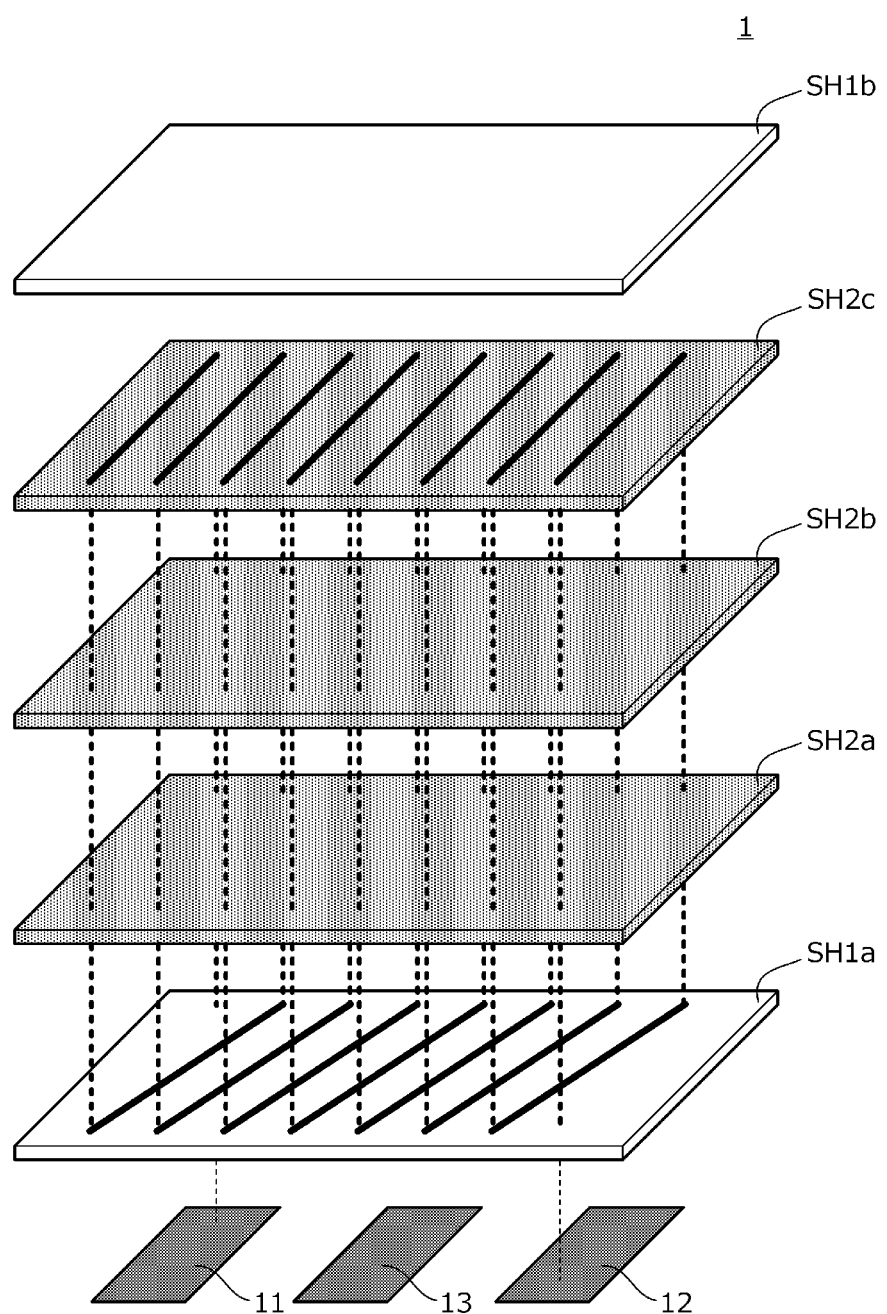
FIG. 16 is an exploded perspective view illustrating a configuration of the first power feed coil 1.

FIG. 13A is a plan view of an antenna device 105 according to the fifth preferred embodiment of the present invention. FIG. 13B is a view showing conductor patterns disposed on a lower surface of the substrate 10. FIG. 14A is a cross-sectional view at A-A' in FIGS. 13A and 13B, and FIG. 14B is a cross-sectional view at B-B' in FIGS. 13A and 13B. FIG. 15 is an enlarged plan view showing a mounting location of the first power feed coil 1. FIG. 16 is an exploded perspective view showing a configuration of the first power feed coil 1. Here, the first power feed coil 1 is the same or substantially the same as the first power feed coil 1 depicted in FIG. 3, except that a dummy terminal 13 is provided.

As FIGS. 13A to 16, a rectangular or substantially rectangular loop shape second power feed coil 2 includes a conductor pattern 2A on the upper surface of the substrate 10, a conductor pattern 2B on the lower surface of the substrate 10, and interlayer connection conductors (via conductors) 2V.

In FIG. 15, the dashed line represents the mounting location of the first power feed coil 1. Terminals of the first power feed coil 1 are connected to the first power feed coil connection electrodes 21 and 22. As described above, the first power feed coil 1 may be connected to the second power feed coil 2 such that the first power feed coil 1 crosses over a portion of the coil antenna 3.

According to the present preferred embodiment, by arranging the coil antenna 3 as well as the first power feed coil 1 on the same substrate, downsizing is achieved. Furthermore, in plan view, the first power feed coil 1 and the coil antenna 3 partially overlap each other. This increases the strength of the coupling between the first power feed coil 1 and the coil antenna 3.

Sixth Preferred Embodiment

Figure 17A:
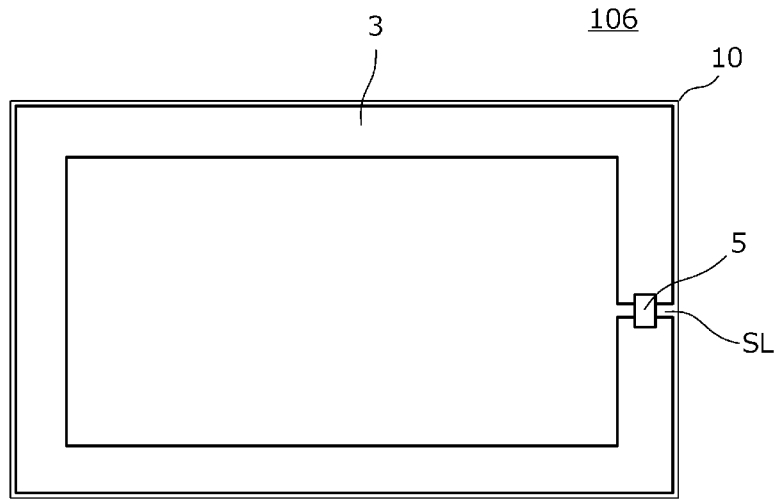
FIG. 17A is a plan view of an antenna device 106 according to a sixth preferred embodiment of the present invention.
Figure 17B:
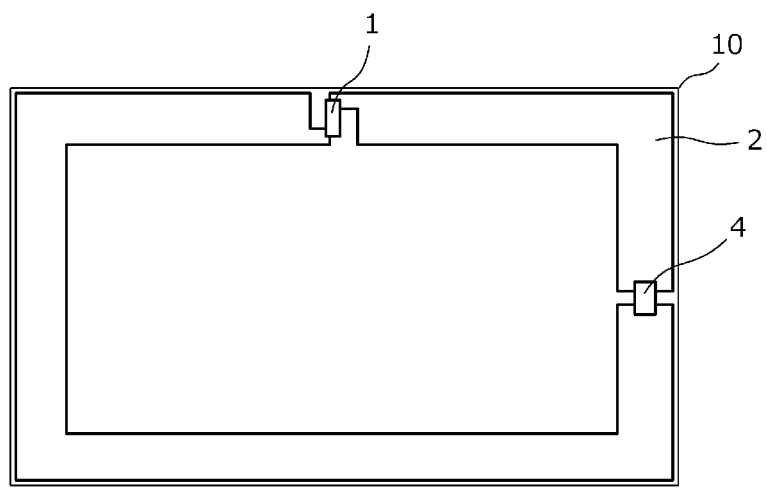
FIG. 17B is a bottom view of the antenna device 106.
Figure 17C:
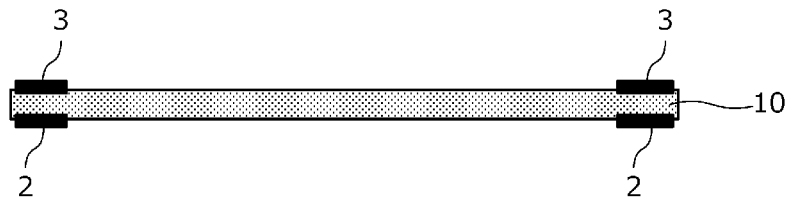
FIG. 17C is a cross-sectional view of the antenna device 106.

FIG. 17A is a plan view of an antenna device 106 according to the sixth preferred embodiment of the present invention, FIG. 17B is a bottom view of the antenna device 106, and FIG. 17C is a cross-sectional view of the antenna device 106.

On the upper surface of the substrate 10, the coil antenna 3 is disposed along the outer edge thereof. The chip capacitor 5 is mounted on the slit SL of the coil antenna 3. On the lower surface of the substrate 10, the second power feed coil 2 is disposed along the outer edge thereof. On the lower surface of the substrate 10, the first power feed coil 1 and the RFIC 4 are mounted and connected in series to the second power feed coil 2.

As described above, the first power feed coil 1 and the second power feed coil 2 may be disposed on the surface opposite to the surface of which the coil antenna 3 is disposed with the substrate therebetween.

According to the present preferred embodiment, the first power feed coil 1 and the coil antenna 3 overlap each other in plan view. This increases the strength of the coupling between the first power feed coil 1 and the coil antenna 3. Furthermore, the second power feed coil 2 is preferably arranged close to the coil antenna 3 (on the opposite surface with the substrate 10 therebetween), and the line width of the second power feed coil 2 is preferably equal or substantially equal to the line width of the coil antenna 3, thus making it possible for their external shapes to have the same or substantially the same size. As shown in FIG. 17C, the second power feed coil 2 and the coil antenna overlap each other in plan view. This increases the area of the region in which the coil antenna 3 and the second power feed coil 2 are close to each other, thus making it possible to have stronger electrical coupling as well as stronger magnetic coupling, and to further increase the strength of coupling.

The second power feed coil 2 and the coil antenna 3 produce the foregoing functions and effects even when their line widths and the exterior shapes are not exactly the same. The foregoing functions and effects are produced as long as the coil antenna 3 and the second power feed coil 2 are at least partially overlapped in planar view.

Alternatively, the coil antenna 3 and the second power feed coil 2 may be respectively disposed on separate substrates and brought in close proximity to each other.

Seventh Preferred Embodiment

Figure 18A:
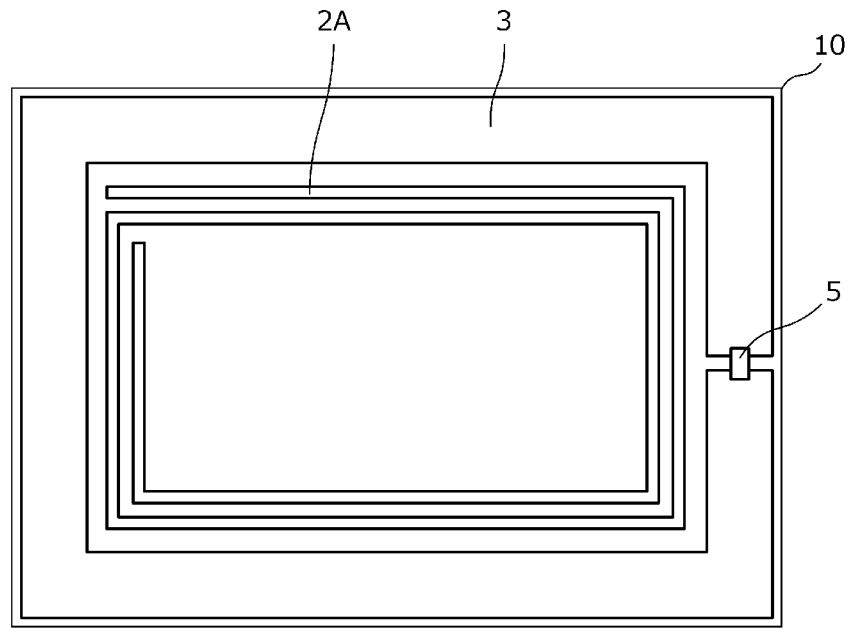
FIG. 18A is a plan view of an antenna device 107 according to a seventh preferred embodiment of the present invention.
Figure 18B:
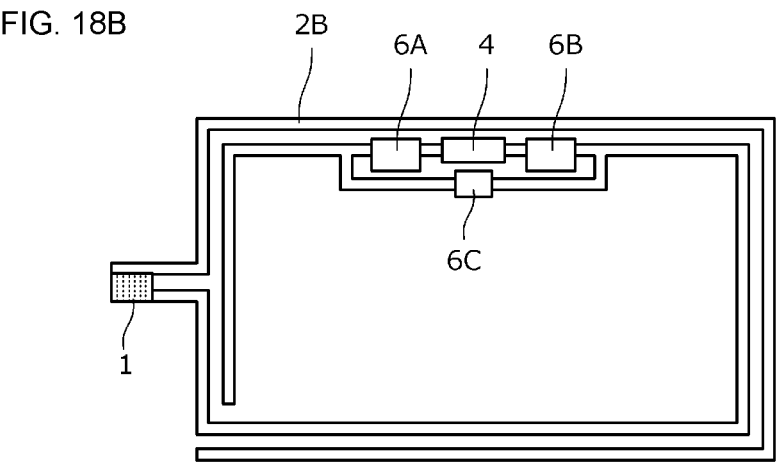
FIG. 18B is a transparent view illustrating conductor patterns and the like that are disposed on a lower surface of a substrate 10 included in the antenna device 107.

FIG. 18A is a plan view of an antenna device 107 according to the seventh preferred embodiment of the present invention, and FIG. 18B is a transparent view (which is not a bottom view) showing conductor patterns that are disposed on the lower surface of the substrate 10 included in the antenna device 107.

In the present preferred embodiment, the second power feed coil 2 includes a plurality of turns. In this example, two spiral conductor patterns 2A and 2B are preferably disposed on the upper and lower surfaces of the substrate 10, and these spiral conductor patterns 2A and 2B define the second power feed coil. The spiral conductor patterns 2A and 2B are structured such that directions of currents respectively flowing through the spiral conductor patterns 2A and 2B are the same when viewed in plan view. Therefore, by structuring the two spiral conductor patterns 2A and 2B so as to at least partially overlap each other, the two spiral conductor patterns 2A and 2B electrically couple with each other.

As described above, a predetermined inductance value may be easily obtained by structuring the second power feed coil in a spiral or such that the second power feed coil includes to two conductor patterns that face each other. Furthermore, the strength of electrical coupling, namely, the capacitance value may be made adjustable. This enables the adjustment of the resonant frequency.

In the present preferred embodiment, matching circuits 6A and 6B and a matching capacitor 6C as well as the first power feed coil 1 and the RFIC 4 are connected to the conductor pattern 2B. As described above, the matching circuit for the RFIC 4 may be connected to the second power feed coil 2.

The coil antenna 3 may include a plurality of turns.

Eighth Preferred Embodiment

Figure 19:
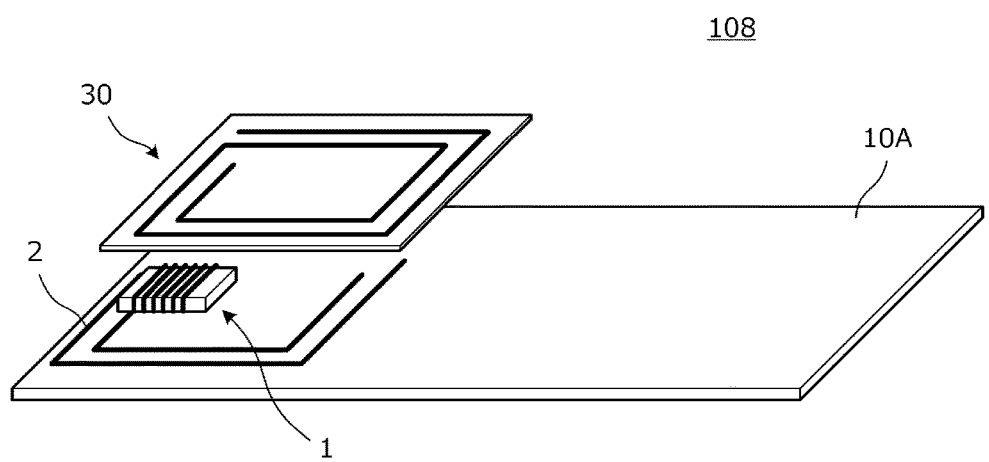
FIG. 19 is a perspective view of an antenna device 108 according to an eighth preferred embodiment of the present invention.

FIG. 19 is a perspective view of an antenna device 108 according to the eighth preferred embodiment of the present invention. In the antenna device 108 of the present preferred embodiment, the second power feed coil 2 is disposed on a first substrate 10A, and the first power feed coil 1 is mounted on this first substrate 10A. Furthermore, the antenna device 108 includes a coil antenna module 30 that is disposed in close proximity to the second power feed coil 2.

Figure 20A:
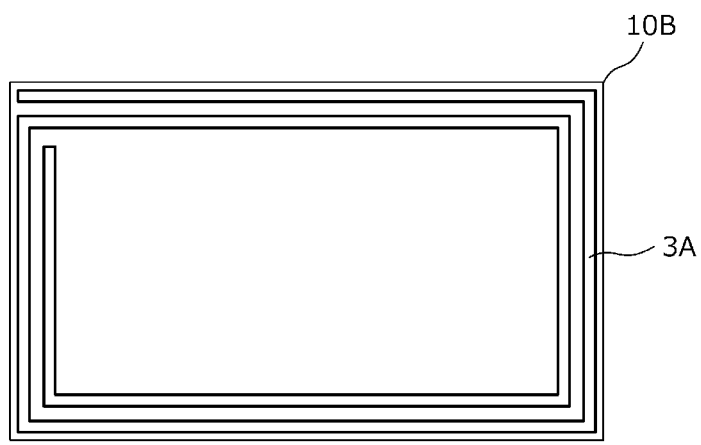
FIG. 20A is a plan view of a coil antenna module 30.
Figure 20B:
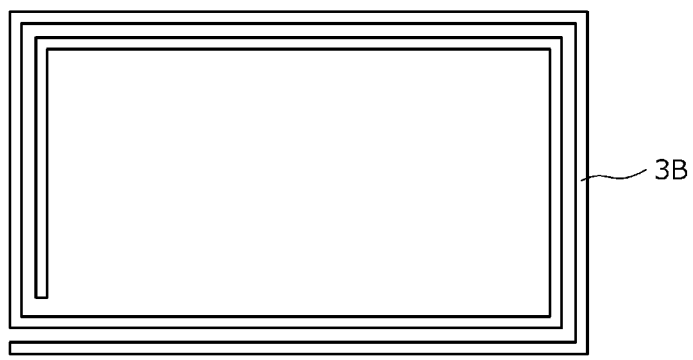
FIG. 20B is a transparent view illustrating conductor patterns disposed on a lower surface of a second substrate 10B included in the coil antenna module 30.

FIG. 20A is a plan view of the coil antenna module 30, and FIG. 20B is a transparent view showing conductor patterns disposed on a lower surface of a second substrate 10B included in the coil antenna module 30.

The coil antenna module 30 is a module in which two spiral conductor patterns 3A and 3B are respectively disposed on the upper and lower surfaces of the second substrate 10B. The two spiral conductor patterns 3A and 3B are structured such that directions of currents respectively flowing through the spiral conductor patterns 3A and 3B are the same as each other when viewed in plan view. Therefore, by structuring the two spiral conductor patterns 3A and 3B so as to at least partially overlap each other, the two spiral conductor patterns 3A and 3B electrically couple with each other. Accordingly, a LC resonance circuit may be provided without the need to provide an additional capacitor.

As described above, the substrate on which the coil antenna module is disposed (coil antenna module 30) and the substrate on which the first power feed coil 1 and the second power feed coil 2 are disposed may be separated components. This improves the design flexibility.

The coil antenna may alternatively include only one spiral pattern. In that case, both end portions of the spiral pattern may be connected via interlayer connector conductors provided in the second substrate 10B and wiring provided on the lower surface of the second substrate 10B, and a capacitor may be connected at an intermediate point of the spiral pattern.

As described above, structuring the coil antenna one spiral pattern or two spiral patterns facilitates the setting of the inductance value, thus making it possible to set a predetermined resonant frequency.

Ninth Preferred Embodiment

In the ninth preferred embodiment of the present invention, an exemplary communication apparatus is described.

FIG. 21A is a plan view of the first substrate 10A embedded in a chassis of a communication apparatus, and FIG. 21B is a transparent view showing conductor patterns disposed on the lower surface of the first substrate 10A.

The two spiral conductor patterns 2A and 2B are respectively disposed on the upper and lower surfaces of the first substrate 10A, and the spiral conductor patterns 2A and 2B define the second power feed coil. The spiral conductor patterns 2A and 2B are structured such that directions of currents respectively flowing through the spiral conductor patterns 2A and 2B is the same when viewed in plan view. Therefore, by structuring the two spiral conductor patterns 2A and 2B so as to at least partially overlap each other, the two spiral conductor patterns 2A and 2B electrically couple with each other. The matching circuits 6A and 6B and the matching capacitor 6C as well as the first power feed coil 1 and the RFIC 4 are connected to the conductor pattern 2A.

Figure 22A:
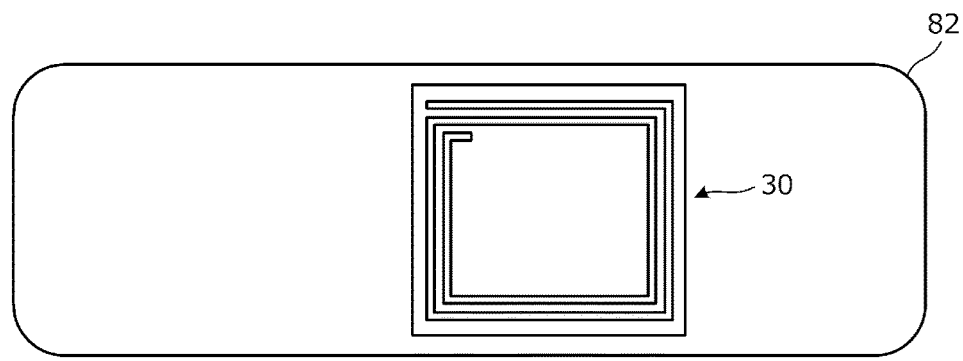
FIG. 22A is a plan view of an inner side of a lower chassis of a communication apparatus.
Figure 22B:
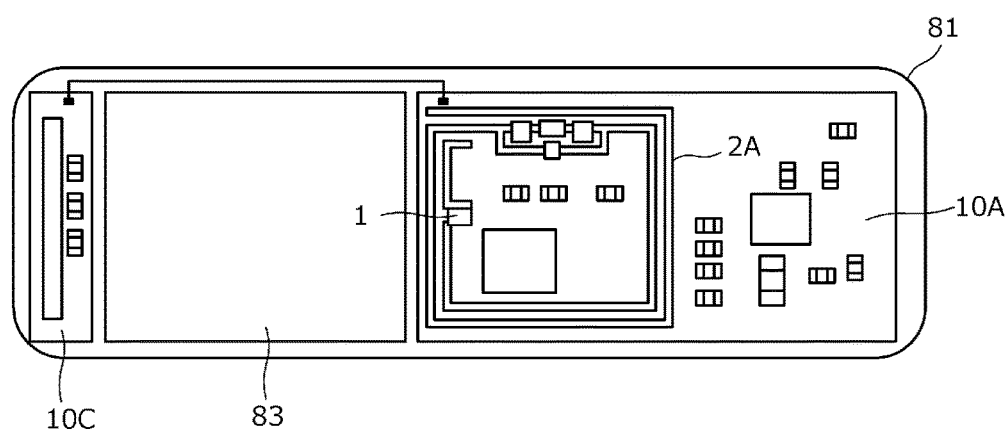
FIG. 22B is a plan view of an upper chassis side.
Figure 23:
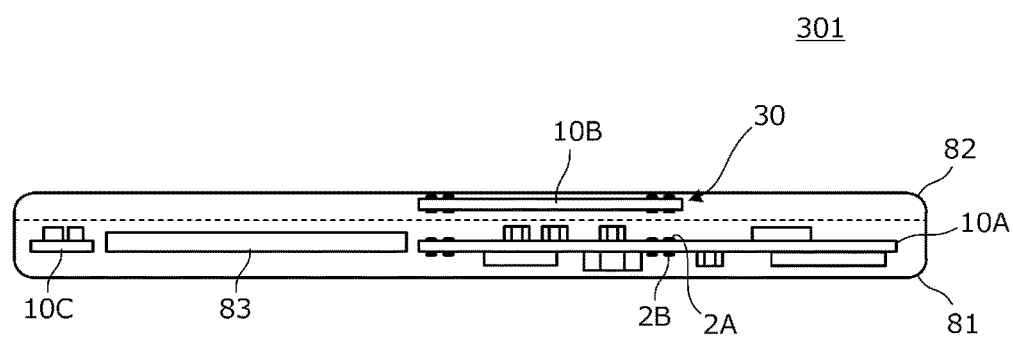
FIG. 23 is a cross-sectional view of a communication apparatus 301.

FIG. 22A is a plan view of an inner side of a lower chassis of a communication apparatus, and FIG. 22B is a plan view of an upper chassis side. FIG. 23 is a cross-sectional view of a communication apparatus 301.

In the upper chassis 81 side, the first substrate 10A is included. As shown in FIGS. 21A and 21B, the first power feed coil 1, the conductor patterns 2A and 2B of the second power feed coil, and other circuits are disposed on this first substrate 10A. In the upper chassis 81 side, a substrate 10C on which an antenna for communication in UHF band is mounted and a battery pack 83 are preferably included. On a lower chassis 82, the coil antenna module 30 is preferably provided. As is the case of the coil antenna module shown in FIG. 20A and FIG. 20B, two spiral patterns are respectively disposed on the upper and lower surfaces of the second substrate 10B.

In a state in which the upper chassis 81 and the lower chassis 82 are fitted together, the coil antenna module 30 faces the first power feed coil 1 and the spiral conductor patterns 2A and 2B of the second power feed coil as shown in FIG. 23.

The coil antenna 3 couples with the second power feed coil 2 not only by magnetic coupling but also by electrical coupling, thus further increasing the strength of the coupling.

As shown in FIG. 22, the coil antenna 3 and the second power feed coil 2 entirely overlap each other when viewed in plan view. Alternatively, when viewed in plan view, the coil antenna 3 and the second power feed coil 2 may be arranged so as to only partially overlap each other.

Tenth Preferred Embodiment

Figure 24:
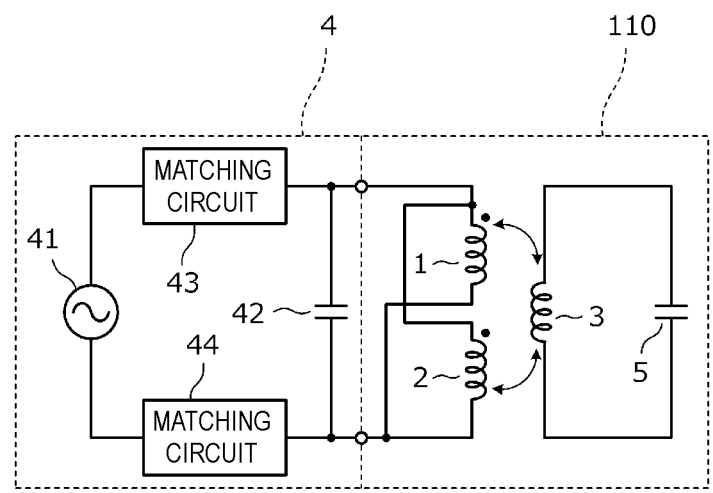
FIG. 24 is a circuit diagram of an antenna device 110 according to a tenth preferred embodiment of the present invention.

FIG. 24 is a circuit diagram of an antenna device 110 according to the tenth preferred embodiment of the present invention. The first power feed coil 1 of the antenna device 110 is connected in parallel to the second power feed coil 2, and the coil antenna 3 is electrically or magnetically coupled with the first power feed coil 1 and the second power feed coil 2. The coil antenna 3 defines a LC resonance circuit with the capacitor 5, and this LC resonance circuit resonates in a frequency band of near field communication.

The RFIC 4 is connected to a parallel circuit including the first power feed coil 1 and the second power feed coil 2. The configuration of the RFIC 4 is the same or substantially the same as the RFIC 4 shown in FIG. 4. As described above, the first power feed coil 1 and the second power feed coil 2 may be connected in parallel. In a case in which a plurality of first power feed coils are provided, these first power feed coils may be connected in parallel.

According to the present preferred embodiment, the inductance of a circuit to be connected to the power feed circuit may be reduced, which enables setting of the resonant frequency. Furthermore, this enables a reduction in the resistance value of a circuit to be connected to the power feed circuit, and enables a reduction in the loss or an increase in Q value.

Eleventh Preferred Embodiment

Figure 25:
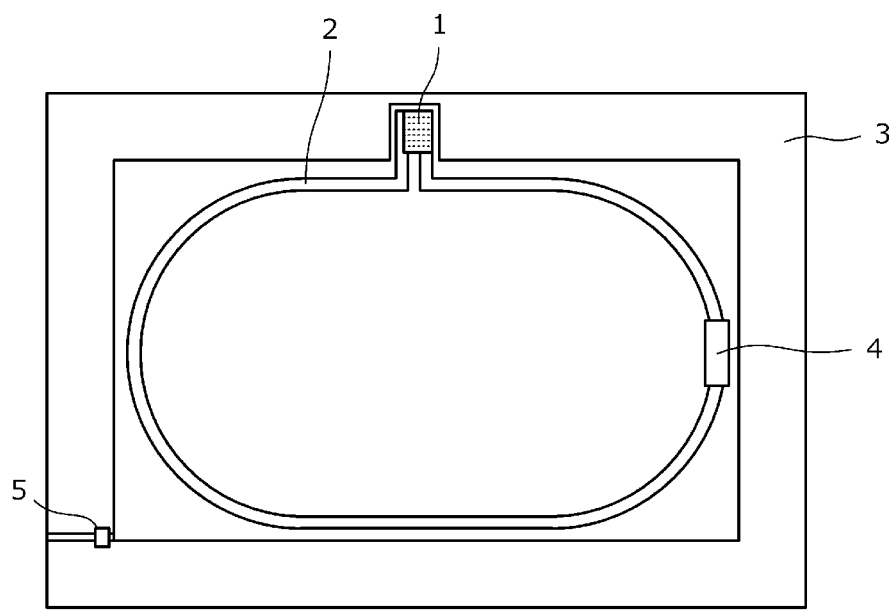
FIG. 25 is a plan view of an antenna device 111A according to an eleventh preferred embodiment of the present invention.
Figure 26:
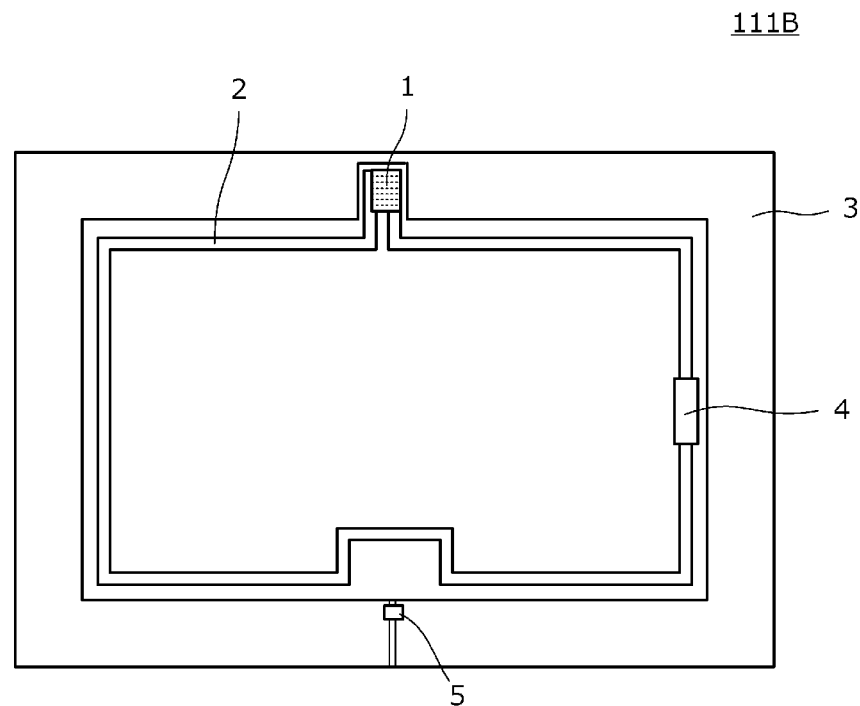
FIG. 26 is a plan view of an antenna device 111B according to the eleventh preferred embodiment of the present invention.

FIGS. 25 and 26 are plan views of antenna devices 111A and 111B according to the eleventh preferred embodiment of the present invention. The antenna devices 111A and 111B each include the coil antenna 3, the first power feed coil 1, the second power feed coil 2, the RFIC 4, and the chip capacitor 5.

As depicted in FIG. 25 and FIG. 26, the second power feed coil 2 does not necessarily follow the inner perimeter of the coil antenna 3 along its entire length, and may preferably be arranged in close proximity to the coil antenna 3 only at some locations. This feature may be used to selectively determine the strength of coupling between the coil antenna 3 and the second power feed coil 2. Furthermore, another component may be disposed in the space between the coil antenna 3 and the second power feed coil 2.

Twelfth Preferred Embodiment

In the twelfth preferred embodiment of the present invention, an example of an antenna device including a touch pad is described.

Figure 27:
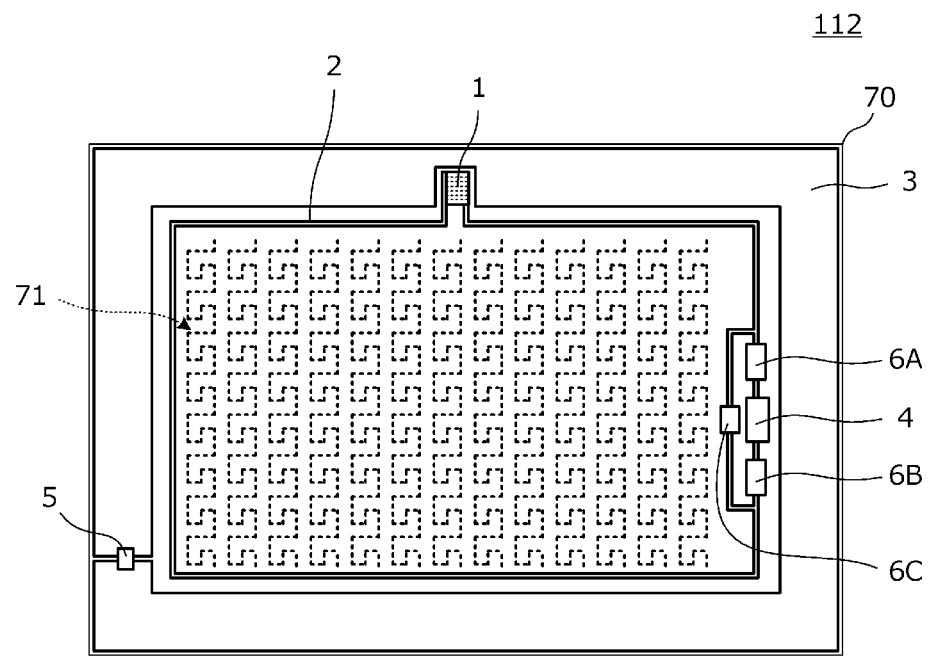
FIG. 27 is a bottom view of an antenna device 112 according to a twelfth preferred embodiment of the present invention.
Figure 28:
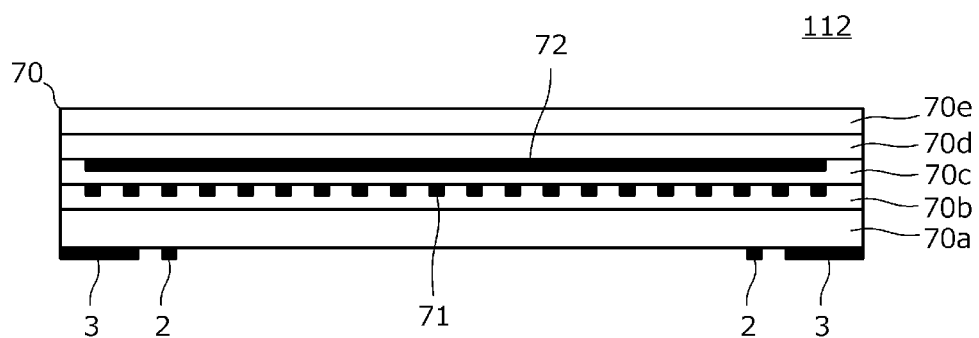
FIG. 28 is a cross-sectional view of the antenna device 112.
Figure 29:
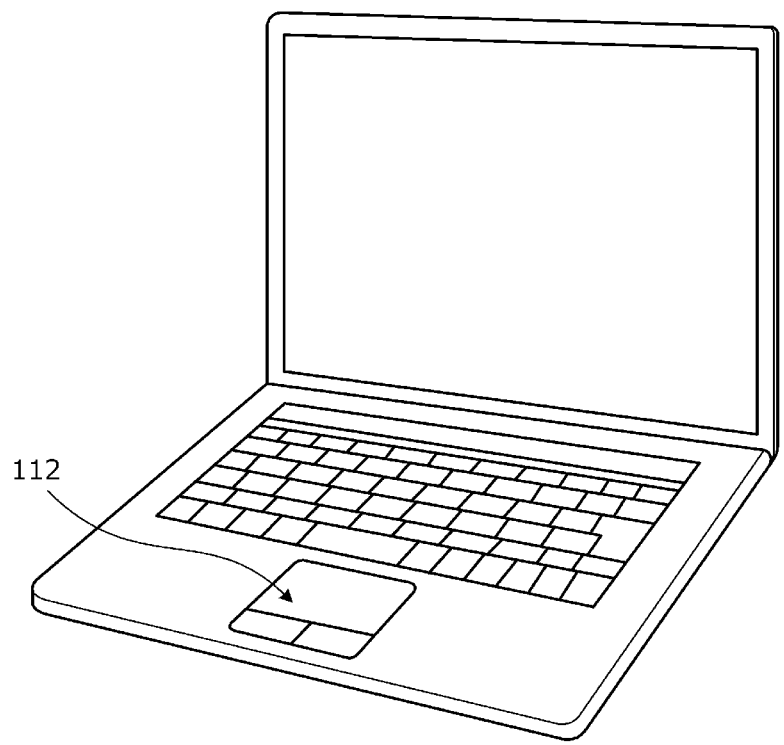
FIG. 29 is a perspective view of a laptop PC including the antenna device 112 at a touch pad.

FIG. 27 is a bottom view of an antenna device 112 according to the present preferred embodiment. FIG. 28 is a cross-sectional view of the antenna device 112. FIG. 29 is a perspective view of a laptop PC including the foregoing antenna device 112 at a touch pad.

As shown in FIG. 27, the antenna device 112 includes, on a touch pad substrate 70, the coil antenna 3, the first power feed coil 1, the second power feed coil 2, the RFIC 4, the chip capacitor 5, the matching circuits 6A and 6B, and the capacitor 6C to provide matching.

As depicted in FIG. 28, the touch pad substrate 70 includes a substrate 70a, an insulation sheet 70b, electrode sheets 70c and 70d, and a protection sheet 70e. On the electrode sheets 70c and 70d, touch operation detection electrodes 71 and 72 are disposed.

As described above, the antenna for near field communication may be embedded in the touch pad by providing various electrodes for the antenna device on the touch pad substrate and mounting chip components thereto.

For example, by passing a RFID card over the touch pad of the laptop PC depicted in FIG. 29 or by placing the RFID card thereon, the laptop PC is able to communicate with the RFID card.

Alternatively, in addition to the touch operation detection electrodes 71 and 72, the coil antenna 3 and the second power feed coil 2 may be disposed on the same electrode layer. This ensures a reduced thickness while allowing the touch pad to include the antenna device.

In the present preferred embodiment, an example is described in which the antenna device is included in the touch pad of the laptop PC. Similarly, the antennas for near field communication may be embedded into display panels or touch panels or other suitable components in smartphones or tablet terminals, for example.

In each of the preferred embodiments described above, an example is described in which the coil antenna 3 includes the coil opening CA3 that is configured in a planar or substantially planar shape along a plane identical, parallel, or substantially parallel to that of the coil opening CA2 of the second power feed coil 2. However, a geometric gravity center (center of gravity without considering density) of the coil antenna 3 may only need to be located within the coil opening CA2 of the second power feed coil 2 when viewed in plan view of the coil opening CA2 of the second power feed coil 2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   a power feed coil to be connected to a power feed circuit; and
   a coil antenna that electrically or magnetically couples with the power feed coil; wherein
   the power feed coil includes at least one first power feed coil and a second power feed coil connected in series to the at least one first power feed coil;
   the at least one first power feed coil magnetically couples with the coil antenna, and the second power feed coil magnetically couples with the coil antenna;
   the second power feed coil includes a coil opening that has a planar or substantially planar shape;
   the coil antenna includes a coil opening that has a planar or substantially planar shape along a plane identical, parallel, or substantially parallel to that of the coil opening of the second power feed coil;
   a geometric gravity center of the coil antenna is located within the coil opening of the second power feed coil when viewed in plan view; and
   a winding axis direction of the at least one first power feed coil crosses or intersects with a winding axis direction of the coil antenna.

2. The antenna device according to claim 1, wherein the at least one first power feed coil includes a plurality of first power feed coils.

3. The antenna device according to claim 2, wherein the plurality of first power feed coils includes two first power feed coils that face each other over the coil opening of the coil antenna.

4. The antenna device according to claim 2, wherein the plurality of first power feed coils includes two first power feed coils whose winding axis directions cross or intersect each other.

5. The antenna device according to claim 1, wherein a winding axis of the second power feed coil and the winding axis of the coil antenna are coaxial or substantially coaxial with one another.

6. The antenna device according to claim 1, further comprising:
   a substrate; wherein
   the power feed coil and the coil antenna are provided on the substrate.

7. The antenna device according to claim 6, wherein a touch operation detection electrode is provided on the substrate.

8. The antenna device according to claim 6, wherein two connection locations, to connect to the second power feed coil, at both end portions of the at least one first power feed coil are arranged at locations such that the at least one first power feed coil crosses over a portion of the coil antenna.

9. The antenna device according to claim 1, further comprising:
   a first substrate and a second substrate; wherein
   the power feed coil is provided on the first substrate; and
   the coil antenna is provided on the second substrate.

10. A communication apparatus comprising:
    an antenna device; and
    a power feed circuit connected to the antenna device; wherein
    the antenna device includes a power feed coil connected to the power feed circuit and a coil antenna;
    the power feed coil includes at least one first power feed coil and a second power feed coil connected in series to the at least one first power feed coil;
    the at least one first power feed coil magnetically couples with the coil antenna, and the second power feed coil magnetically couples with the coil antenna;
    the second power feed coil includes a coil opening that has a planar or substantially planar shape;
    the coil antenna includes a coil opening that has a planar or substantially planar shape along a plane identical, parallel, or substantially parallel to that of the coil opening of the second power feed coil;
    a geometric gravity center of the coil antenna is located within the coil opening of the second power feed coil when viewed in plan view; and
    a winding axis direction of the at least one first power feed coil crosses or intersects with a winding axis direction of the coil antenna.

11. The communication apparatus according to claim 10, wherein the at least one first power feed coil includes a plurality of first power feed coils.

12. The communication apparatus according to claim 11, wherein the plurality of first power feed coils includes two first power feed coils that face each other over the coil opening of the coil antenna.

13. The communication apparatus according to claim 11, wherein the plurality of first power feed coils includes two first power feed coils whose winding axis directions cross or intersect each other.

14. The communication apparatus according to claim 10, wherein a winding axis of the second power feed coil and the winding axis of the coil antenna are coaxial or substantially coaxial with one another.

15. The communication apparatus according to claim 10, further comprising:
  a substrate; wherein
    the power feed coil and the coil antenna are provided on the substrate.

16. The communication apparatus according to claim 15, wherein a touch operation detection electrode is provided on the substrate.

17. The communication apparatus according to claim 15, wherein two connection locations, to connect to the second power feed coil, at both end portions of the at least one first power feed coil are arranged at locations such that the first power feed coil crosses over a portion of the coil antenna.

18. The communication apparatus according to claim 10, further comprising:
  a first substrate and a second substrate; wherein
    the power feed coil is provided on the first substrate; and
    the coil antenna is provided on the second substrate.

* * * * *